US010442881B2

(12) United States Patent
Hlavinka et al.

(10) Patent No.: US 10,442,881 B2
(45) Date of Patent: Oct. 15, 2019

(54) DUAL CATALYST SYSTEM FOR PRODUCING LLDPE COPOLYMERS WITH A NARROW MOLECULAR WEIGHT DISTRIBUTION AND IMPROVED PROCESSABILITY

(71) Applicant: Chevron Phillips Chemical Company LP, The Woodlands, TX (US)

(72) Inventors: Mark L. Hlavinka, Kingwood, TX (US); Chung Ching Tso, Bartlesville, OK (US); Yongwoo Inn, Bartlesville, OK (US); Deloris R. Gagan, Ramona, OK (US); Randy S. Muninger, Dewey, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 15/973,610

(22) Filed: May 8, 2018

(65) Prior Publication Data

US 2018/0258205 A1   Sep. 13, 2018

Related U.S. Application Data

(63) Continuation of application No. 15/345,586, filed on Nov. 8, 2016, now Pat. No. 10,000,594.

(51) Int. Cl.
| C08F 210/16 | (2006.01) |
| C08F 4/6592 | (2006.01) |
| C08L 23/08 | (2006.01) |
| C08J 9/228 | (2006.01) |
| C08F 4/659 | (2006.01) |

(52) U.S. Cl.
CPC ............ *C08F 210/16* (2013.01); *C08J 9/228* (2013.01); *C08L 23/0815* (2013.01); *C08F 4/65904* (2013.01); *C08F 2500/02* (2013.01); *C08F 2500/04* (2013.01); *C08F 2500/12* (2013.01); *C08F 2500/17* (2013.01); *C08F 2500/18* (2013.01); *C08F 2500/26* (2013.01); *C08J 2201/03* (2013.01); *C08J 2323/08* (2013.01)

(58) Field of Classification Search
CPC . C08F 210/16; C08F 4/65904; C08L 23/0815
See application file for complete search history.

(56) References Cited

U.S. PATENT DOCUMENTS

| 3,242,099 A | 3/1966 | Manyik et al. |
| 3,248,179 A | 4/1966 | Norwood |
| 4,501,885 A | 2/1985 | Sherk et al. |
| 4,588,790 A | 5/1986 | Jenkins, III et al. |
| 4,794,096 A | 12/1988 | Ewen |
| 4,808,561 A | 2/1989 | Welborn, Jr. |
| 5,352,749 A | 10/1994 | DeChellis et al. |
| 5,436,304 A | 7/1995 | Griffin et al. |
| 5,565,175 A | 10/1996 | Hottovy et al. |
| 5,575,979 A | 11/1996 | Hanson |
| 5,576,259 A | 11/1996 | Hasegawa et al. |
| 5,807,938 A | 9/1998 | Kaneko et al. |
| 5,919,983 A | 7/1999 | Rosen et al. |
| 6,107,230 A | 8/2000 | McDaniel et al. |
| 6,165,929 A | 12/2000 | McDaniel et al. |
| 6,239,235 B1 | 5/2001 | Hottovy et al. |
| 6,262,191 B1 | 7/2001 | Hottovy et al. |
| 6,294,494 B1 | 9/2001 | McDaniel et al. |
| 6,300,271 B1 | 9/2001 | McDaniel et al. |
| 6,316,553 B1 | 11/2001 | McDaniel et al. |
| 6,355,594 B1 | 3/2002 | McDaniel et al. |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,524,987 B1 | 2/2003 | Collins et al. |
| 6,548,441 B1 | 4/2003 | McDaniel et al. |
| 6,548,442 B1 | 4/2003 | McDaniel et al. |
| 6,576,583 B1 | 6/2003 | McDaniel et al. |
| 6,579,583 B2 | 6/2003 | Patel |
| 6,613,712 B1 | 9/2003 | McDaniel et al. |
| 6,632,894 B1 | 10/2003 | McDaniel et al. |
| 6,667,274 B1 | 12/2003 | Hawley et al. |
| 6,750,302 B1 | 6/2004 | McDaniel et al. |
| 6,833,415 B2 | 12/2004 | Kendrick et al. |
| 7,026,494 B1 | 4/2006 | Yang et al. |
| 7,041,617 B2 | 5/2006 | Jensen et al. |
| 7,119,153 B2 | 10/2006 | Jensen et al. |
| 7,226,886 B2 | 6/2007 | Jayaratne et al. |
| 7,294,599 B2 | 11/2007 | Jensen et al. |
| 7,312,283 B2 | 12/2007 | Martin et al. |
| 7,517,939 B2 | 4/2009 | Yang et al. |
| 7,531,606 B2 | 5/2009 | Hendrickson |
| 7,598,327 B2 | 10/2009 | Shaw |
| 7,601,665 B2 | 10/2009 | McDaniel et al. |
| 7,619,047 B2 | 11/2009 | Yang et al. |
| 7,884,163 B2 | 2/2011 | McDaniel et al. |
| 8,114,946 B2 | 2/2012 | Yang et al. |
| 8,309,485 B2 | 11/2012 | Yang et al. |
| 8,461,280 B2 | 6/2013 | Eriksson et al. |
| 8,618,229 B2 | 12/2013 | Hlavinka |
| 8,623,973 B1 | 1/2014 | McDaniel et al. |
| 8,785,576 B2 | 7/2014 | Hlavinka et al. |
| 8,791,217 B2 | 7/2014 | Hlavinka et al. |

(Continued)

OTHER PUBLICATIONS

Bird et al., entitled "*Dynamics of Polymeric Liquids*," Fluid Mechanics, 2nd Ed., John Wiley & Sons (1987), vol. 1, 3 pages.

(Continued)

*Primary Examiner* — Caixia Lu
(74) *Attorney, Agent, or Firm* — Merchant & Gould P.C.

(57) ABSTRACT

Disclosed herein are ethylene-based polymers generally characterized by a Mw ranging from 70,000 to 200,000 g/mol, a ratio of Mz/Mw ranging from 1.8 to 20, an 1B parameter ranging from 0.92 to 1.05, and an ATREF profile characterized by one large peak. These polymers have the dart impact, tear strength, and optical properties of a metallocene-catalyzed LLDPE, but with improved processability, melt strength, and bubble stability, and can be used in blown film and other end-use applications.

21 Claims, 11 Drawing Sheets

(56) References Cited

U.S. PATENT DOCUMENTS

| | | | |
|---|---|---|---|
| 8,822,608 | B1 | 9/2014 | Bhandarkar et al. |
| 8,877,672 | B2 | 11/2014 | Hlavinka et al. |
| 8,895,679 | B2 | 11/2014 | Hlavinka |
| 8,937,139 | B2 | 1/2015 | Hlavinka et al. |
| 9,023,959 | B2 | 5/2015 | McDaniel et al. |
| 9,034,991 | B2 | 5/2015 | Hlavinka et al. |
| 9,206,303 | B2 | 12/2015 | Yun et al. |
| 9,228,036 | B2 | 1/2016 | Berbee et al. |
| 9,346,897 | B2 * | 5/2016 | Cui .............. C08J 5/18 |
| 9,352,537 | B2 | 5/2016 | Fuchs et al. |
| 9,394,387 | B2 | 7/2016 | Hlavinka |
| 10,000,594 | B2 | 6/2018 | Hlavinka et al. |
| 2014/0128563 | A1 | 5/2014 | McDaniel et al. |
| 2015/0126692 | A1 * | 5/2015 | Sukhadia ........ C08F 210/16 526/64 |
| 2019/0100606 | A1 * | 4/2019 | Ding ................ C08J 5/18 |

OTHER PUBLICATIONS

Brochure, "*INNATE*™ *Precision Packaging Resins*," The Dow Chemical Company, 2015, 8 pages.
*Film Extrusion Manual—Process, Materials, Properties*, TAPPI Press, 1992, 13 pages.
Hieber et al., entitled "*Some Correlations Involving the Sear Viscosity of Polystyrene Melts*," Rheol. Acta, 28, (1989), pp. 321-332.
Hieber et al., entitled "*Shear-Rate-Dependence Modeling of Polymer Melt Viscosity*," Polym. Eng. Sci., (1992), vol. 32, pp. 931-938.
*Modern Plastics Encyclopedia*, Mid-Nov. 1995 Issue, vol. 72, No. 12, 3 pages.

\* cited by examiner

DUAL CATALYST SYSTEM FOR PRODUCING LLDPE COPOLYMERS WITH A NARROW MOLECULAR WEIGHT DISTRIBUTION AND IMPROVED PROCESSABILITY

REFERENCE TO RELATED APPLICATION

This application is a continuation application of co-pending U.S. patent application Ser. No. 15/345,586, filed on Nov. 8, 2016, now U.S. Pat. No. 10,000,594, the disclosure of which is incorporated herein by reference in its entirety.

BACKGROUND OF THE INVENTION

Polyolefins such as high density polyethylene (HDPE) homopolymer and linear low density polyethylene (LLDPE) copolymer can be produced using various combinations of catalyst systems and polymerization processes. Ziegler-Natta and chromium-based catalyst systems can, for example, produce ethylene polymers having good extrusion processability and polymer melt strength and bubble stability in blown film applications, typically due to their broad molecular weight distribution (MWD). Metallocene based catalyst systems can, for example, produce ethylene polymer having good impact strength, tear resistance, and optical properties, but often at the expense of poor extrusion processability, melt strength, and bubble stability.

In some end-uses, such as blown film applications, it can be beneficial to have the properties of a metallocene-catalyzed LLDPE copolymer, but with improved processability, melt strength, and bubble stability. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to ethylene polymers (e.g., comprising an ethylene/α-olefin copolymer) characterized by a Mw in a range from about 70,000 to about 200,000 g/mol and a ratio of Mz/Mw in a range from about 1.8 to about 20. The ethylene polymer can have an D3 parameter in a range from about 0.92 to about 1.05. Additionally or alternatively, the ethylene polymer can have an ATREF profile characterized by a peak ATREF temperature (temperature of the highest peak on the ATREF curve) in a range from about 68 to about 78° C., or from about 70 to about 77° C., with no other significant peaks on the ATREF curve. Additionally or alternatively, the ethylene polymer (e.g., comprising an ethylene/α-olefin copolymer) can be characterized by from about 0.05 to about 5 wt. % (or from about 0.1 to about 3 wt. %) of the polymer eluted below a temperature of 40° C. in an ATREF test, by from about 20 to about 40 wt. % (or from about 25 to about 38 wt. %) of the polymer eluted between 76 and 86° C. in an ATREF test, by from about 7 to about 20 wt. % (or from about 9 to about 18 wt. %) of the polymer eluted above a temperature of 86° C. in an ATREF test, and the remainder of the polymer (to reach 100 wt. %) eluted between 40 and 76° C. in an ATREF test.

These polymers, in further aspects, can be characterized by a Mw in a range from about 80,000 to about 180,000 g/mol (or from about 90,000 to about 150,000 g/mol), and/or a ratio of Mz/Mw in a range from about 1.8 to about 8 (or from about 2 to about 10), and/or an D3 parameter in a range from about 0.94 to about 1.04 (or from about 0.95 to about 1.05), and/or a melt index (MI) in a range from about 0.2 to about 10 g/10 min (or from about 0.5 to about 2.5 g/10 min), and/or a density in a range from about 0.90 to about 0.93 g/cm$^3$ (or from about 0.91 to about 0.925 g/cm$^3$), and/or a Mn in a range from about 5,000 to about 65,000 g/mol (or from about 30,000 to about 55,000 g/mol), and/or a Mz in a range from about 150,000 to about 1,500,000 g/mol (or from about 200,000 to about 900,000 g/mol), and/or a ratio of Mw/Mn in a range from about 2 to about 9 (or from about 2.4 to about 4), and/or a CY-a parameter in a range from about 0.05 to about 0.5 (or from about 0.17 to about 0.45), and/or a zero-shear viscosity in a range from about 3000 to about 100,000 Pa-sec (or from about 4000 to about 25,000 Pa-sec).

These ethylene polymers can be used to produce various articles of manufacture, such as films (e.g., blown films), sheets, pipes, geomembranes, and molded products.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
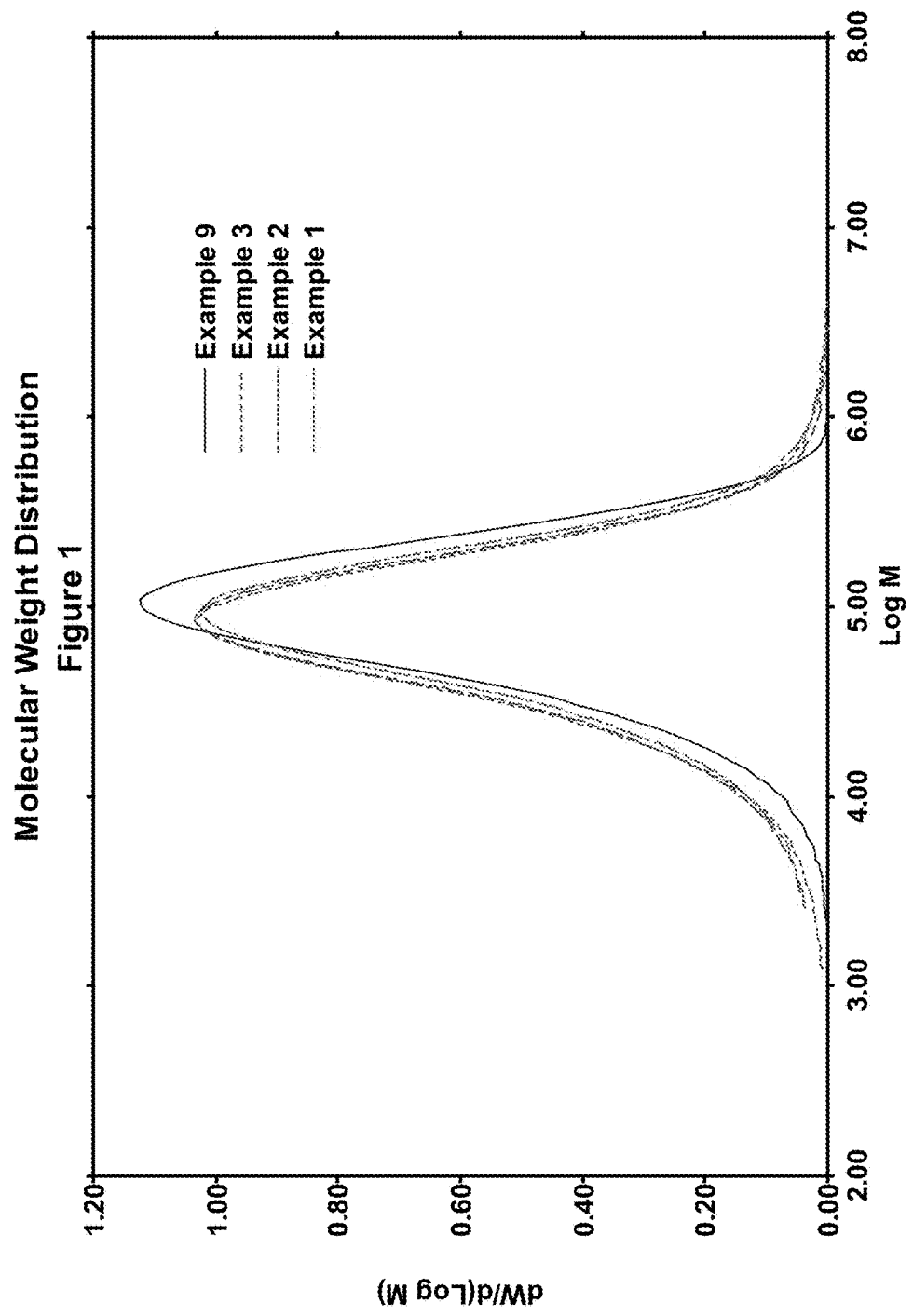
FIG. 1 presents a plot of the molecular weight distributions of the polymers of Examples 1-3 and 9.
Figure 2:
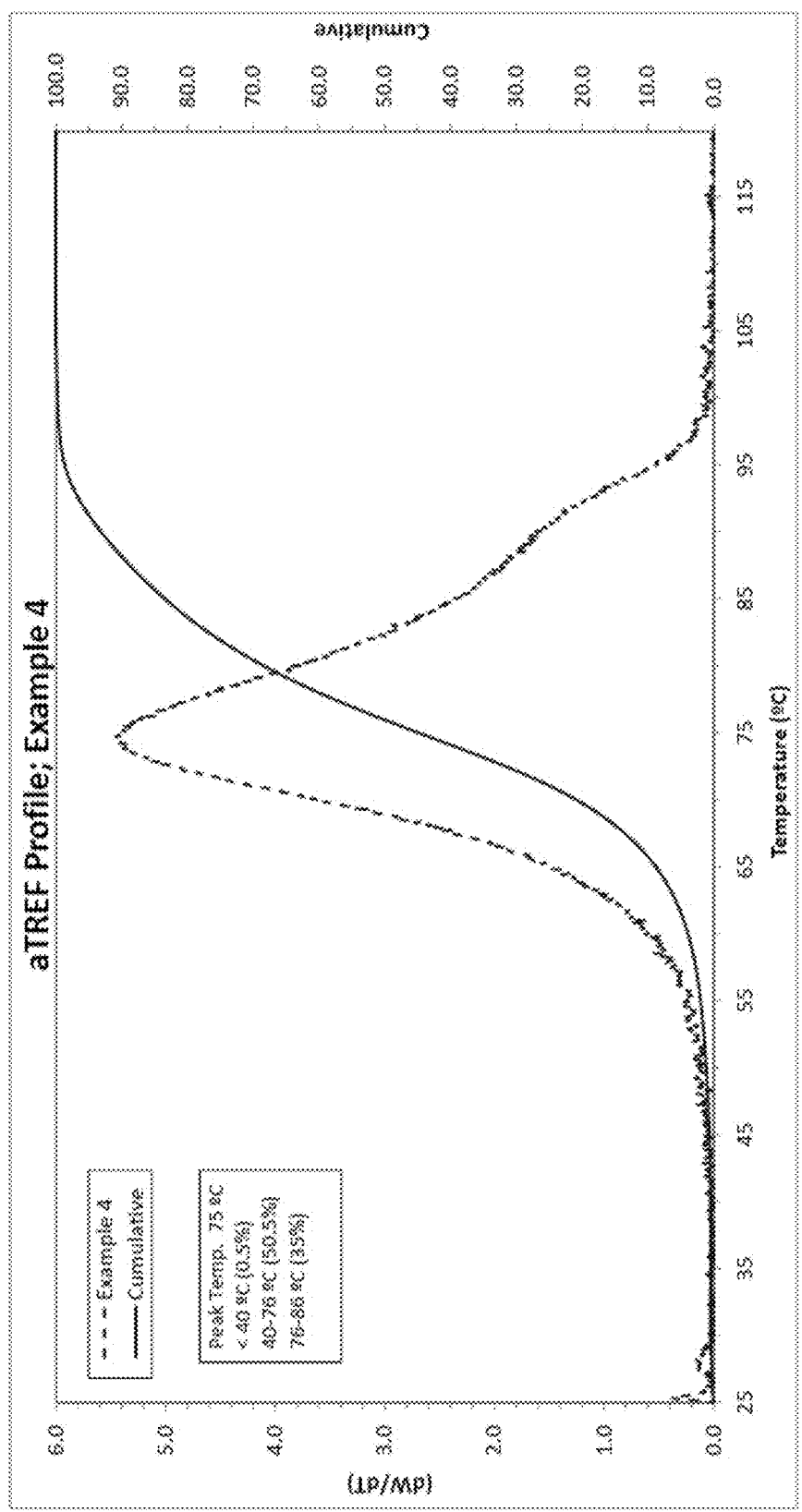
FIG. 2 presents a plot of the ATREF profile of the polymer of Example 4.
Figure 3:
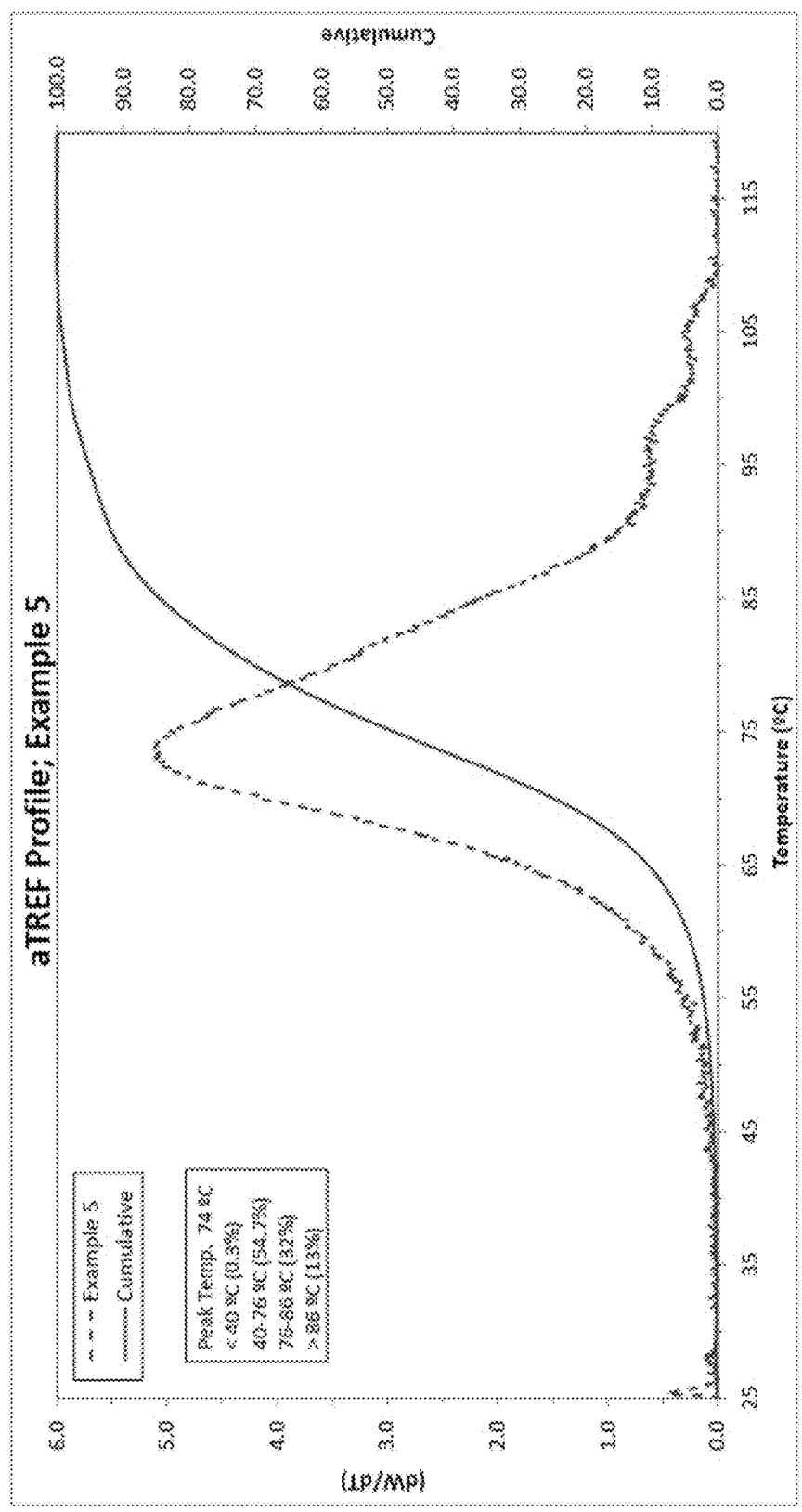
FIG. 3 presents a plot of the ATREF profile of the polymer of Example 5.
Figure 4:
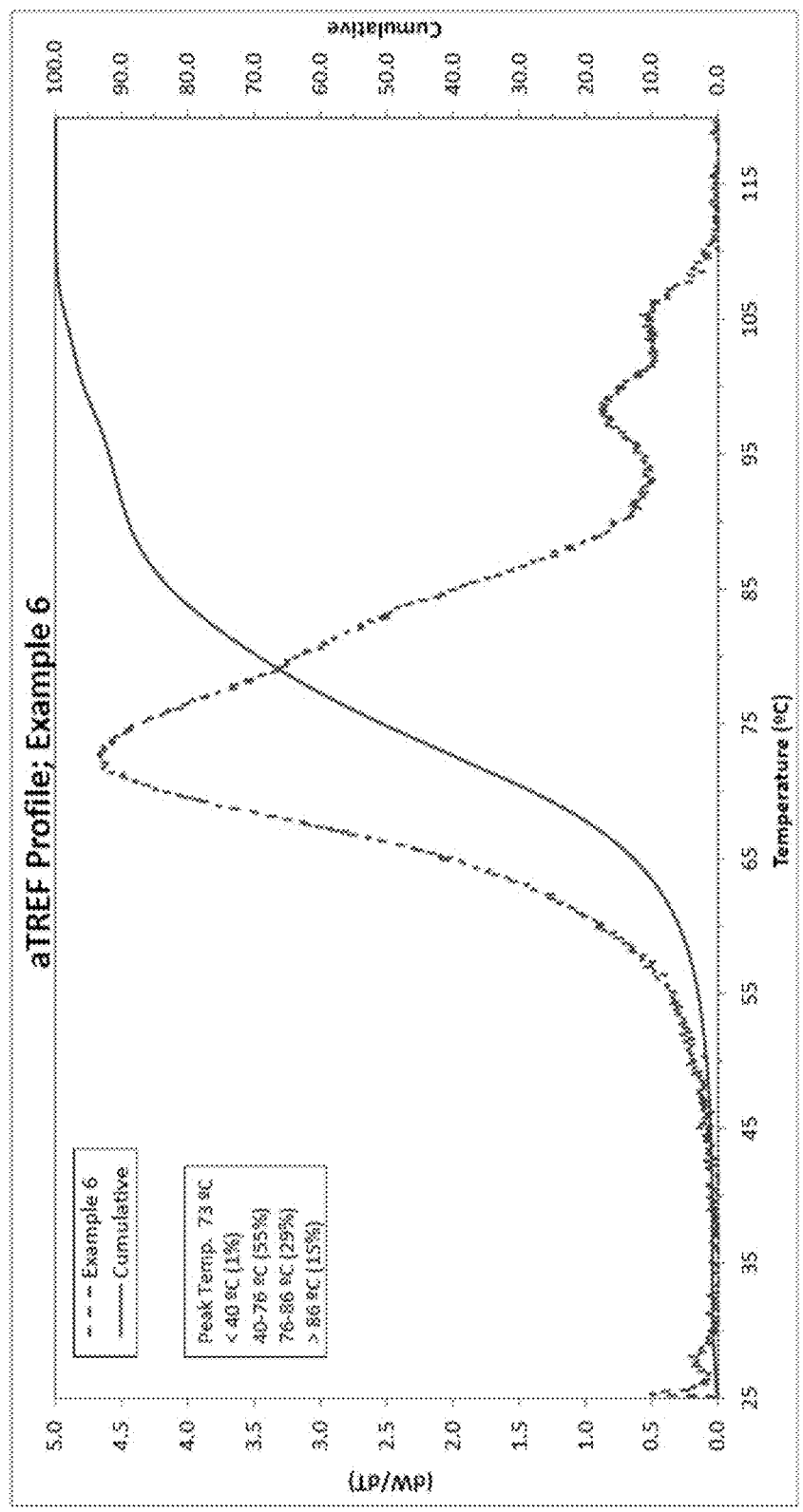
FIG. 4 presents a plot of the ATREF profile of the polymer of Example 6.
Figure 5:
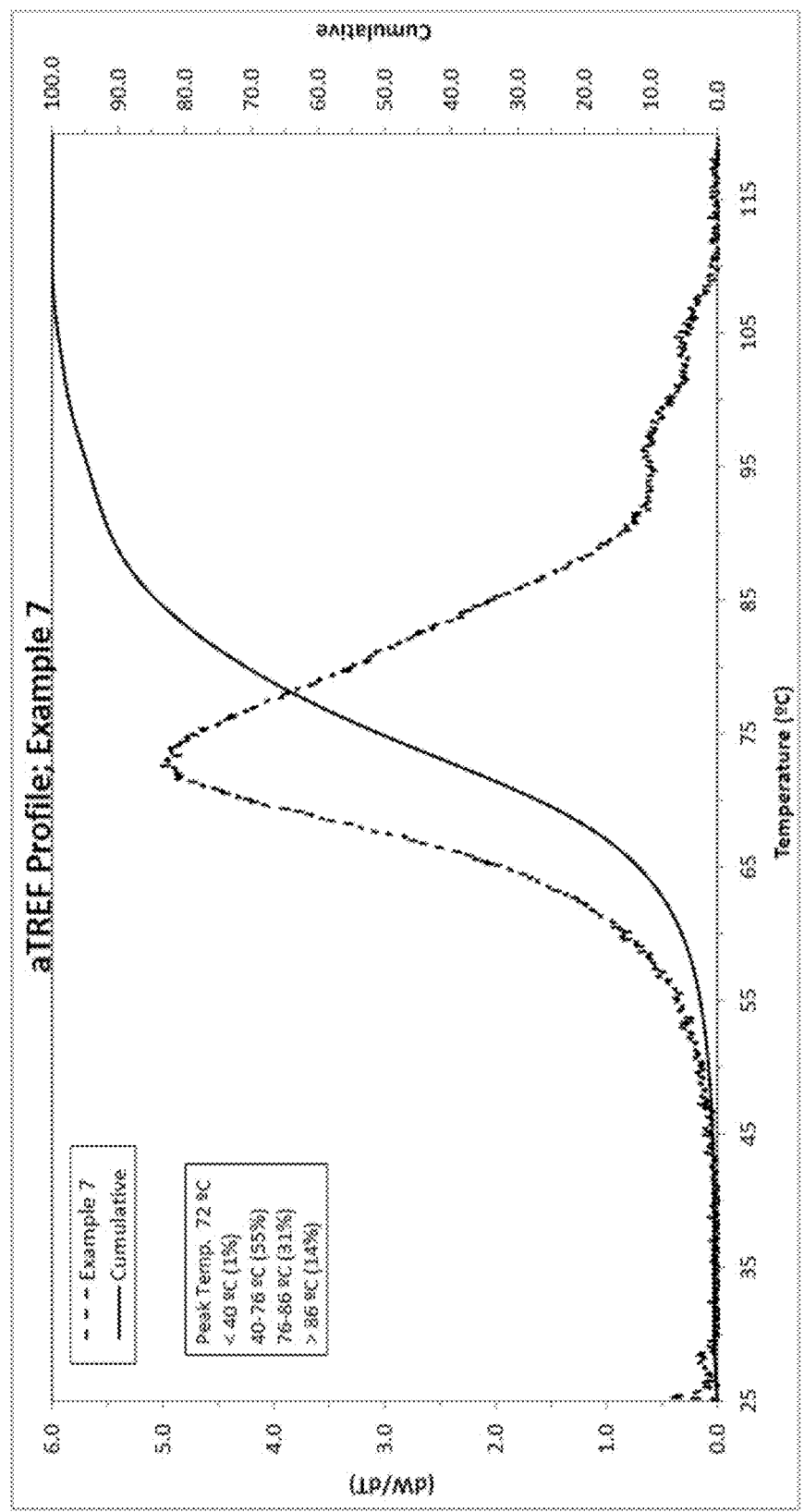
FIG. 5 presents a plot of the ATREF profile of the polymer of Example 7.
Figure 6:
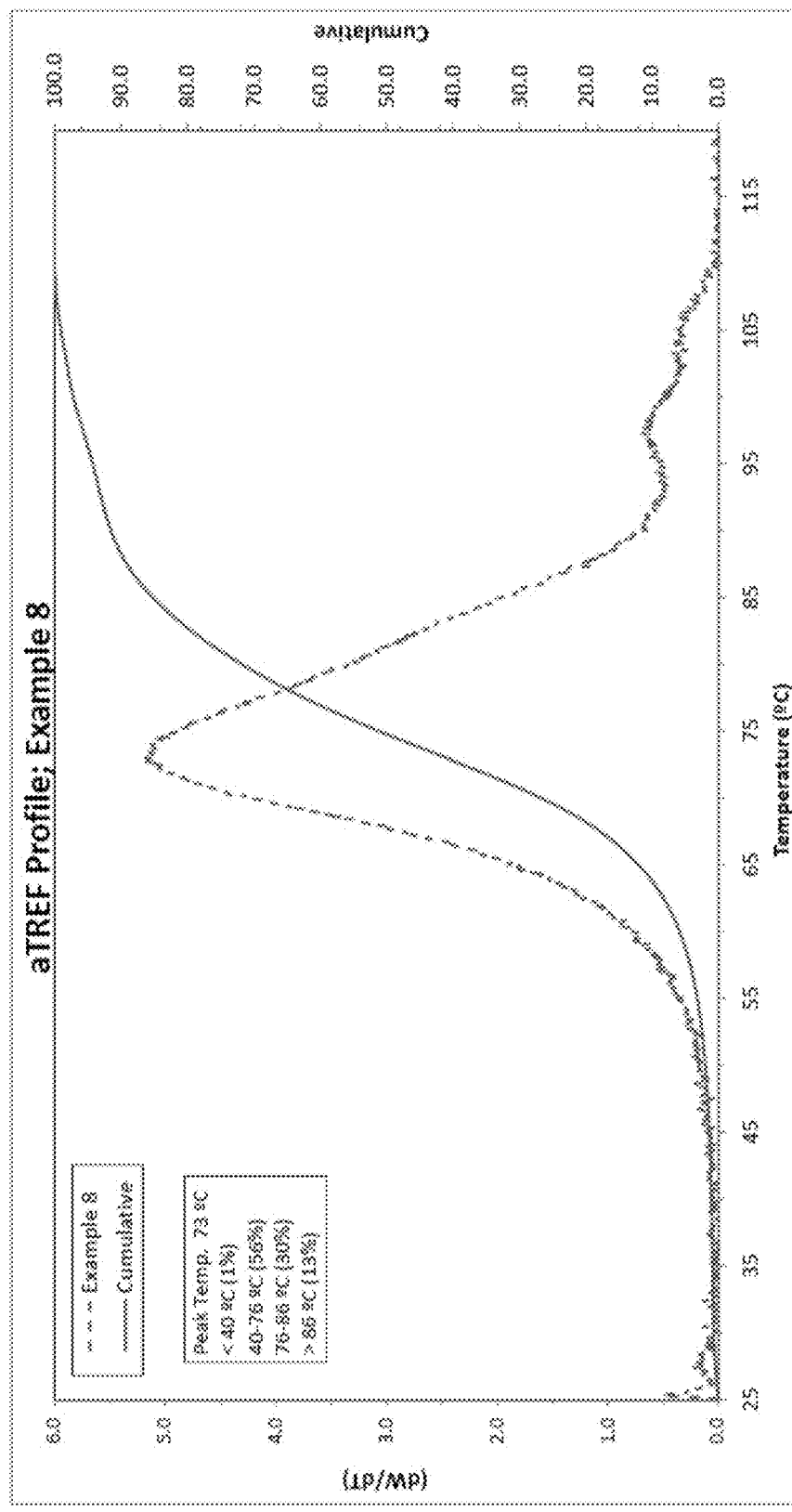
FIG. 6 presents a plot of the ATREF profile of the polymer of Example 8.
Figure 7:
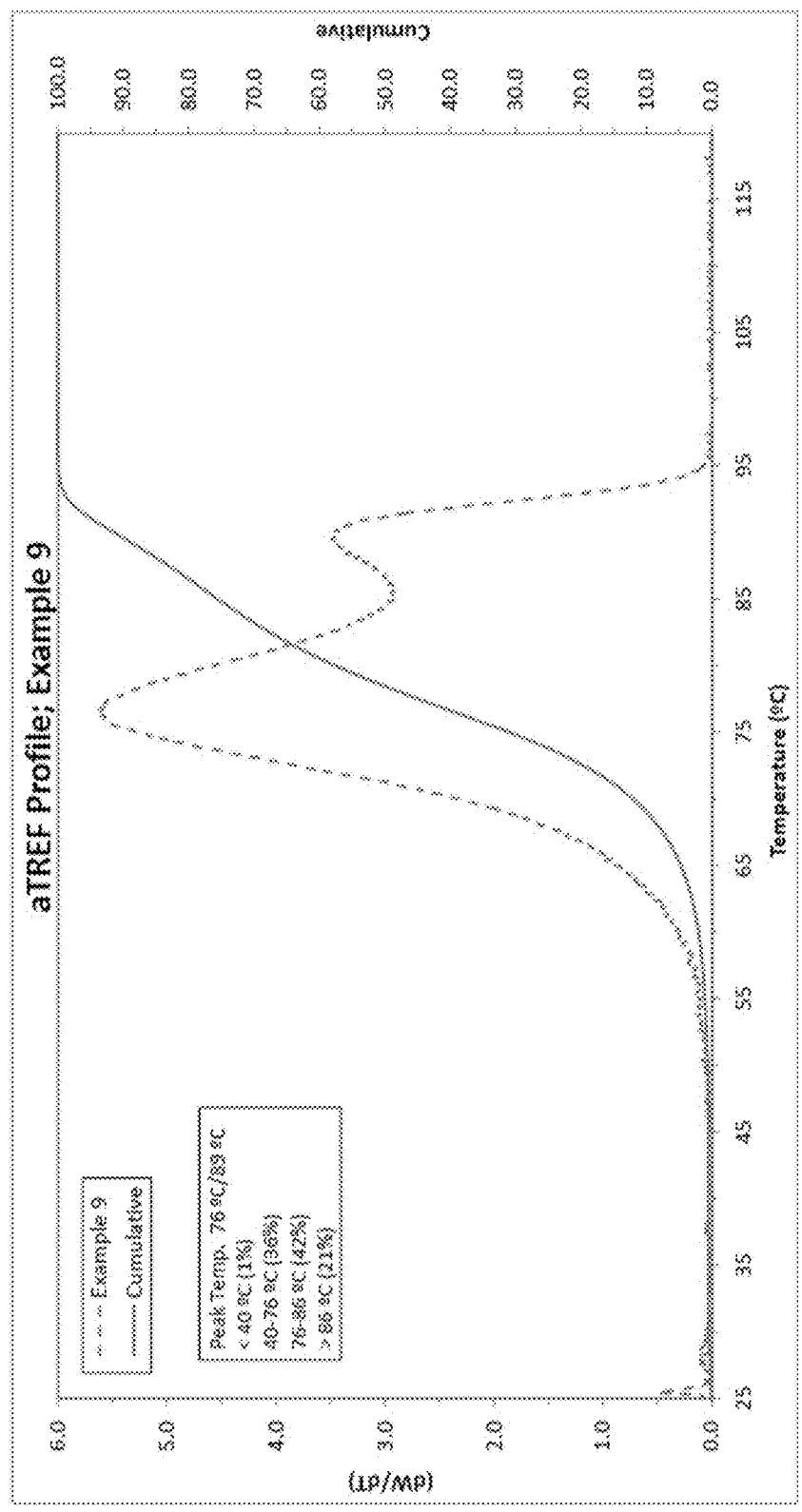
FIG. 7 presents a plot of the ATREF profile of the polymer of Example 9.
Figure 8:
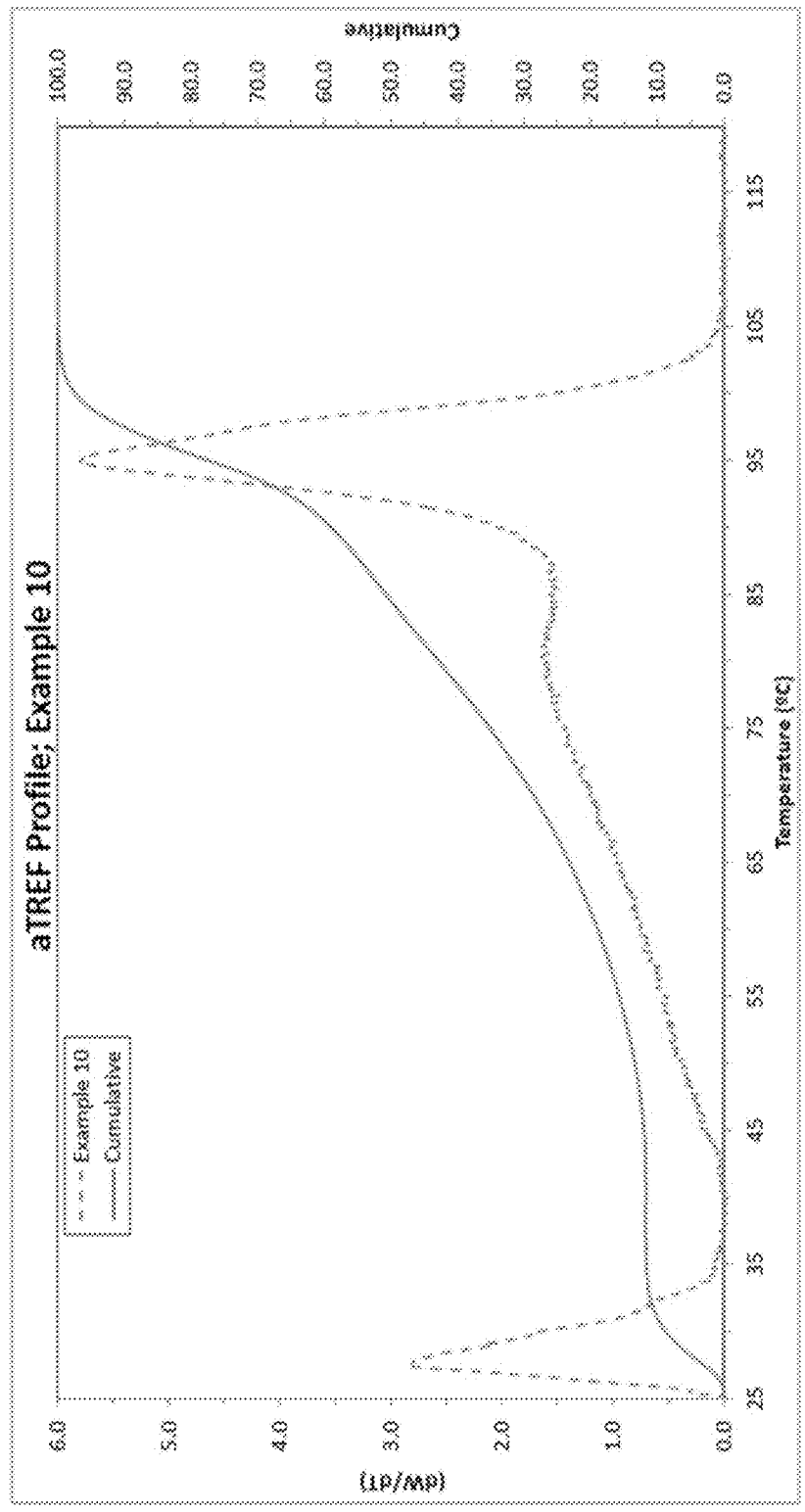
FIG. 8 presents a plot of the ATREF profile of the polymer of Example 10.
Figure 9:
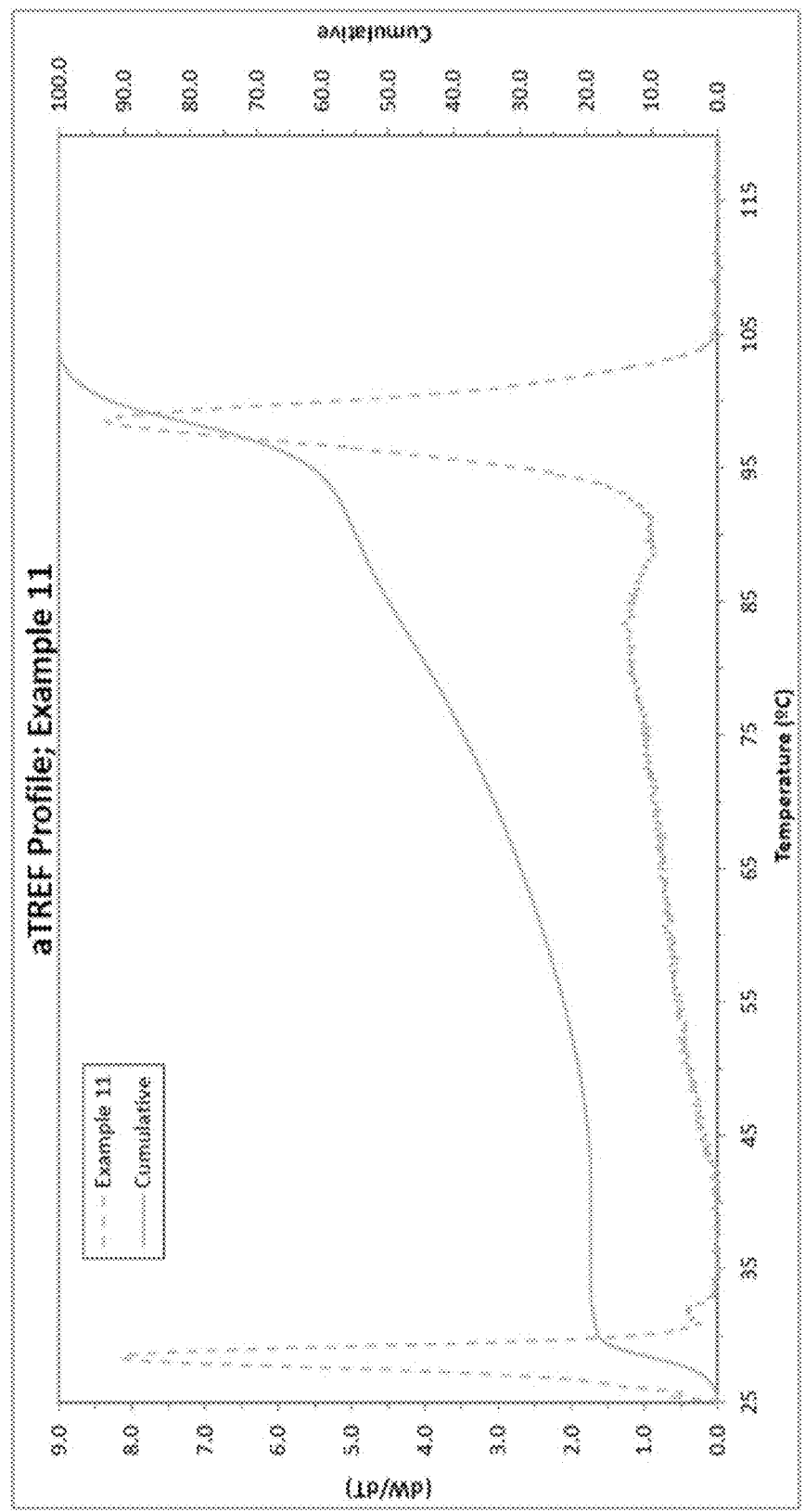
FIG. 9 presents a plot of the ATREF profile of the polymer of Example 11.
Figure 10:
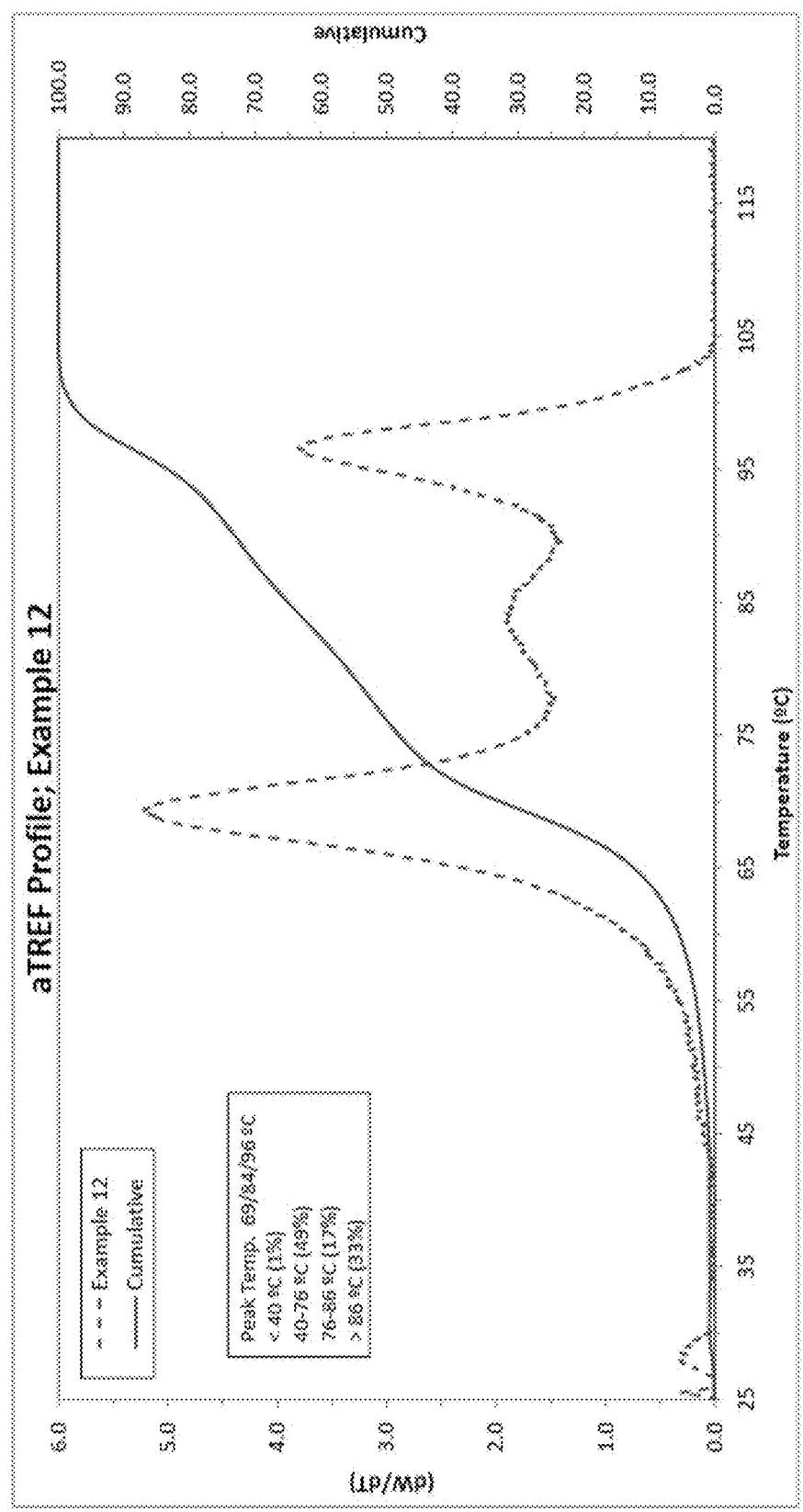
FIG. 10 presents a plot of the ATREF profile of the polymer of Example 12.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, processes, and/or methods described herein are contemplated with or without explicit description of the particular combination. Additionally, unless explicitly recited otherwise, any aspect and/or feature disclosed herein can be combined to describe inventive features consistent with the present disclosure.

While compositions and methods are described herein in terms of "comprising" various components or steps, the compositions and methods can also "consist essentially of" or "consist of" the various components or steps, unless stated otherwise. For example, a catalyst composition consistent with aspects of the present invention can comprise; alternatively, can consist essentially of; or alternatively, can consist of; catalyst component I, catalyst component II, an activator, and a co-catalyst.

The terms "a," "an," "the," etc., are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers, and is inclusive of lower molecular weight polymers or oligomers.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "chemically-treated solid oxide," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The "activator-support" of the present invention can be a chemically-treated solid oxide. The terms "support" and "activator-support" are not used to imply these components are inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands may include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound, the transition metal imine phenolate complex, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The term "contact product" is used herein to describe compositions wherein the components are contacted together in any order, in any manner, and for any length of time, unless otherwise specified. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another.

Similarly, the term "contacting" is used herein to refer to materials which can be blended, mixed, slurried, dissolved, reacted, treated, or otherwise contacted in some other manner.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mz/Mw of an ethylene polymer consistent with aspects of this invention. By a disclosure that the ratio of Mz/Mw can be in a range from about 1.8 to about 20, the intent is to recite that the ratio of Mz/Mw can be any ratio in the range and, for example, can be equal to about 1.8, about 2, about 3, about 4, about 5, about 6, about 7, about 8, about 9, about 10, about 11, about 12, about 13, about 14, about 15, about 16, about 17, about 18, about 19, or about 20. Additionally, the ratio of Mz/Mw can be within any range from about 1.8 to about 20 (for example, from about 2 to about 10), and this also includes any combination of ranges between about 1.8 and about 20 (for example, the Mz/Mw ratio can be in a range from about 1.9 to about 7, or from about 12 to about 18). Likewise, all other ranges disclosed herein should be interpreted in a manner similar to these examples.

DETAILED DESCRIPTION OF THE INVENTION

The present invention is directed generally to ethylene-based polymers having excellent strength and toughness properties, but with improved processability and melt strength. Articles produced from these ethylene-based polymers, such as blown films, can have excellent dart impact, tear strength, and optical properties, but can be processed more easily and with better bubble stability than traditional metallocene-catalyzed LLDPE resins.

Ethylene Polymers

Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ $\alpha$-olefin; alternatively, the olefin comonomer can comprise a $C_4$-$C_{10}$ $\alpha$-olefin; alternatively, the olefin comonomer can comprise 1-butene, 1-hexene, 1-octene, or any combination thereof; or alternatively, the comonomer can comprise 1-hexene. Typically, the amount of the comonomer, based on the total weight of monomer (ethylene) and comonomer, can be in a range from about 0.01 to about 20 wt. %, from about 0.1 to about 10 wt. %, from about 0.5 to about 15 wt. %, from about 0.5 to about 8 wt. %, or from about 1 to about 15 wt. %.

In one aspect, the ethylene polymer of this invention can comprise an ethylene/$\alpha$-olefin copolymer, while in another aspect, the ethylene polymer can comprise an ethylene homopolymer, and in yet another aspect, the ethylene polymer of this invention can comprise an ethylene/$\alpha$-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof; or alternatively, an ethylene/1-hexene copolymer.

An illustrative and non-limiting example of an ethylene polymer (e.g., comprising an ethylene copolymer) of the present invention can have a Mw in a range from about 70,000 to about 200,000 g/mol, a ratio of Mz/Mw in a range from about 1.8 to about 20, and an D3 parameter in a range from about 0.92 to about 1.05. Another illustrative and non-limiting example of an ethylene polymer of the present invention can have a Mw in a range from about 70,000 to about 200,000 g/mol, a ratio of Mz/Mw in a range from about 1.8 to about 20, and an ATREF profile characterized by a peak ATREF temperature (temperature of the highest peak on the ATREF curve) in a range from about 68 to about 78° C. (or from about 70 to about 77° C., or from about 72 to about 75° C.), with no other significant peaks on the ATREF curve. These illustrative and non-limiting examples of ethylene polymers consistent with the present invention also can have any of the polymer properties listed below and in any combination, unless indicated otherwise.

The densities of ethylene-based polymers disclosed herein often are less than or equal to about 0.935 g/cm³, for example, less than or equal to about 0.93, or less than or equal to about 0.925 g/cm³. Yet, in particular aspects, the density can be in a range from about 0.89 to about 0.935 g/cm³, from about 0.90 to about 0.93 g/cm³, from about 0.905 to about 0.925 g/cm³, from about 0.91 to about 0.925 g/cm³, from about 0.912 to about 0.922 g/cm³, or from about 0.914 to about 0.918 g/cm³.

While not being limited thereto, ethylene polymers described herein often can have a melt index (MI) in a range from about 0.2 to about 10 g/10 min, from about 0.3 to about 8 g/10 min, or from about 0.4 to about 6 g/10 min. In further aspects, ethylene polymers described herein can have a melt index (MI) in a range from about 0.5 to about 5 g/10 min, from about 0.4 to about 4 g/10 min, from about 0.5 to about 2.5 g/10 min, from about 0.7 to about 2.5 g/10 min, or from about 0.8 to about 2 g/10 min.

In an aspect, ethylene polymers described herein can have a ratio of Mw/Mn, or the polydispersity index, in a range from about 2 to about 9, from about 2 to about 6, from about 2 to about 4.5, or from about 2 to about 4. In another aspect, ethylene polymers described herein can have a Mw/Mn in a range from about 2.3 to about 6, from about 2.3 to about 4, from about 2.3 to about 3.7, from about 2.4 to about 5, from about 2.4 to about 4, from about 2.4 to about 3.5, or from about 2.6 to about 3.4.

In an aspect, ethylene polymers described herein can have a ratio of Mz/Mw in a range from about 1.8 to about 20, from about 1.8 to about 10, from about 1.9 to about 15, or from about 1.9 to about 8. In another aspect, ethylene polymers described herein can have a Mz/Mw in a range from about 1.9 to about 7, from about 1.9 to about 6.4, from about 1.8 to about 6, from about 2 to about 15, from about 2 to about 10, from about 2 to about 8, or from about 2.2 to about 7.

In an aspect, ethylene polymers described herein can have a weight-average molecular weight (Mw) in a range from about 70,000 to about 200,000 g/mol, from about 75,000 to about 175,000 g/mol, from about 80,000 to about 180,000 g/mol, or from about 80,000 to about 160,000 g/mol. In another aspect, ethylene polymers described herein can have a Mw in a range from about 80,000 to about 150,000 g/mol, from about 90,000 to about 190,000 g/mol, from about 90,000 to about 150,000 g/mol, or from about 107,000 to about 140,000 g/mol.

In an aspect, ethylene polymers described herein can have a number-average molecular weight (Mn) in a range from about 5,000 to about 75,000 g/mol, from about 5,000 to about 65,000 g/mol, or from about 10,000 to about 50,000 g/mol. In another aspect, ethylene polymers described herein can have a Mn in a range from about 20,000 to about 65,000 g/mol, from about 25,000 to about 60,000 g/mol, from about 30,000 to about 55,000 g/mol, from about 35,000 to about 45,000 g/mol, or from about 36,000 to about 44,000 g/mol.

In an aspect, ethylene polymers described herein can have a z-average molecular weight (Mz) in a range from about 150,000 to about 1,500,000, from about 150,000 to about 1,000,000 g/mol, or from about 150,000 to about 750,000 g/mol. In another aspect, ethylene polymers described herein can have a Mz in a range from about 175,000 to about 1,000,000 g/mol, from about 200,000 to about 1,200,000 g/mol, from about 200,000 to about 900,000, from about 200,000 to about 600,000 g/mol, or from about 210,000 to about 890,000 g/mol.

In an aspect, ethylene polymers described herein can have a peak molecular weight (Mp) in a range from about 50,000 to about 200,000 g/mol, from about 60,000 to about 200,000 g/mol, from about 60,000 to about 160,000 g/mol, or from about 65,000 to about 160,000 g/mol. In another aspect, ethylene polymers described herein can have a Mp in a range from about 65,000 to about 150,000 g/mol, from about 70,000 to about 120,000 g/mol, from about 80,000 to about 120,000 g/mol, or from about 80,000 to about 100,000 g/mol.

In accordance with certain aspects of this invention, the IB parameter from a molecular weight distribution curve (plot of dW/d(Log M) vs. Log M; normalized to an area equal to 1) can be an important characteristic of the ethylene polymers described herein. The D3 parameter is often referred to as the integral breadth, and is defined as 1/[dW/d(Log M)], and is useful to describe a polymer having a relatively narrow molecular weight distribution with a small fraction of both high molecular weight and low molecular weight tails. Generally, the IB parameter of the ethylene polymers consistent with this invention can be in a range from about 0.92 to about 1.05, from about 0.95 to about 1.02, or from about 0.96 to about 1. In one aspect, the ethylene polymer can be characterized by an D3 parameter in a range from about 0.94 to about 1.04, and in another aspect, from about 0.94 to about 1.03, and in yet another aspect, from about 0.95 to about 1.05, and in still another aspect, from about 0.96 to about 1.02.

In accordance with certain aspects of this invention, the ethylene polymers described herein can have a unique ATREF profile. For instance, the ethylene polymer can have a peak ATREF temperature (temperature of the highest peak on the ATREF curve) in a range from about 68 to about 78° C., from about 70 to about 77° C., or from about 72 to about 75° C. Moreover, there is only one significant peak on the ATREF curve; there are no other peaks on the ATREF curve above a dW/dT of 2 in height (plot of dW/dT vs. T; normalized to an area equal to 1). Further, in some instances, there are no other peaks on the ATREF curve above a dW/dT of 2 in height that are present at a peak temperature of above 80° C., or above 82° C. Additionally or alternatively, the ethylene polymer (e.g., comprising an ethylene/α-olefin copolymer) can be characterized by from about 0.05 to about 5 wt. % (or from about 0.1 to about 3 wt. %, or from about 0.3 to about 1 wt. %) of the polymer eluted below a temperature of 40° C. in an ATREF test, by from about 20 to about 40 wt. % (or from about 25 to about 38 wt. %, or from about 29 to about 35 wt. %) of the polymer eluted between 76 and 86° C. in an ATREF test, by from about 7 to about 20 wt. % (or from about 9 to about 18 wt. %, or from about 13 to about 15 wt. %) of the polymer eluted above a temperature of 86° C. in an ATREF test, and the remainder of the polymer (to reach 100 wt. %) eluted between 40 and 76° C. in an ATREF test.

In some aspects, ethylene polymers described herein can have a zero-shear viscosity at 190° C. in a range from about 1000 to about 100,000 Pa-sec, from about 3000 to about 50,000 Pa-sec, from about 4000 to about 25,000 Pa-sec, from about 4000 to about 18,000 Pa-sec, or from about 4900 to about 16,000 Pa-sec Additionally or alternatively, these ethylene polymers can have a CY-a parameter in a range from about 0.05 to about 0.5, from about 0.15 to about 0.5, from about 0.17 to about 0.45, from about 0.2 to about 0.43, or from about 0.15 to about 0.35. The zero-shear viscosity and the CY-a parameter are determined from viscosity data measured at 190° C. and using the Carreau-Yasuda (CY) empirical model as described herein.

Generally, ethylene polymers consistent with certain aspects of the invention can have a unimodal molecular weight distribution (as determined using gel permeation chromatography (GPC) or other suitable analytical technique). In a unimodal molecular weight distribution, there is a single identifiable peak.

In an aspect, the ethylene polymer described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

Articles and Products

Articles of manufacture can be formed from, and/or can comprise, the ethylene polymers of this invention and, accordingly, are encompassed herein. For example, articles which can comprise ethylene polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of ethylene polymers described herein, and the article of manufacture can be or can comprise a blown film.

In some aspects, the article produced from and/or comprising an ethylene polymer of this invention is a film product. For instance, the film can be a blown film or a cast film that is produced from and/or comprises any of the ethylene polymers disclosed herein. Such films also can contain one or more additives, non-limiting examples of which can include an antioxidant, an acid scavenger, an antiblock additive, a slip additive, a colorant, a filler, a processing aid, a UV inhibitor, and the like, as well as combinations thereof.

Also contemplated herein is a method for forming or preparing an article of manufacture comprising any ethylene polymer disclosed herein. For instance, a method can comprise (i) contacting a catalyst composition with ethylene and an olefin comonomer under polymerization conditions in a polymerization reactor system to produce an ethylene polymer, wherein the catalyst composition can comprise catalyst component I, catalyst component II, an activator (e.g., an activator-support comprising a solid oxide treated with an electron-withdrawing anion), and an optional co-catalyst (e.g., an organoaluminum compound); and (ii) forming an article of manufacture comprising the ethylene polymer. The forming step can comprise blending, melt processing, extruding, molding, or thermoforming, and the like, including combinations thereof.

Also contemplated herein is a method for making a film (e.g., a blown film, a cast film, etc.) comprising any ethylene polymer disclosed herein. For instance, the method can comprise melt processing the ethylene polymer through a die to form the film. Suitably, the die can be configured based on the film to be produced, for example, an annular blown film die to produce a blown film, a slot or cast film die to produce a cast film, and so forth. Moreover, any suitable means of melt processing can be employed, although extrusion typically can be utilized. As above, additives can be combined with the polymer in the melt processing step (extrusion step), such as antioxidants, acid scavengers, antiblock additives, slip additives, colorants, fillers, processing aids, UV inhibitors, and the like, as well as combinations thereof.

Films disclosed herein, whether cast or blown, can be any thickness that is suitable for the particular end-use application, and often, the average film thickness can be in a range from about 0.25 to about 250 mils, or from about 0.5 to about 20 mils. For certain film applications, typical average thicknesses can be in a range from about 0.25 to about 8 mils, from about 0.5 to about 8 mils, from about 0.8 to about 5 mils, or from about 0.7 to about 2 mils.

In an aspect and unexpectedly, the films disclosed herein (e.g., blown films) can have a high dart impact strength. Further, such films also can have relatively low haze and high shrink, as compared to conventional blown films of generally the same nominal density. For instance, a blown film consistent with aspects of this invention can have a dart impact strength greater than or equal to about 300 g/mil. In some aspects, the film can have a dart impact greater than or equal to about 400 g/mil, greater than or equal to about 500 g/mil, greater than or equal to about 750 g/mil, greater than or equal to about 1000 g/mil, greater than or equal to about 1200 g/mil, or greater than or equal to about 1400 g/mil, and often can range up to about 1500-2000 g/mil or more. For many film applications, the upper limit on dart impact is not determined, so long as the dart impact exceeds a particular minimal value or threshold.

In another aspect, blown films described herein can be characterized by the MD (or TD) Elmendorf tear strength. Suitable ranges for the MD tear strength can include, but are not limited to, from about 40 to about 500 g/mil, from about 45 to about 300 g/mil, from about 50 to about 250 g/mil, from about 70 to about 225 g/mil, or from about 80 to about 200 g/mil. Suitable ranges for the TD tear strength can include, but are not limited to, from about 350 to about 800 g/mil, from about 400 to about 750 g/mil, from about 425 to about 675 g/mil, or from about 480 to about 560 g/mil.

In an aspect, film products of this invention (e.g., nominal 1-mil films) also can be characterized by relatively good optical properties, such as low haze, i.e., in the absence of any additives that might impact such measurements, for example, slip and antiblock additives. Representative blown films described herein can have a film haze of less than or equal to about 10%, less than or equal to about 8%, less than or equal to about 6%, or less than or equal to about 5%, or in a range from about 3 to about 5%, and often the film haze can range down to 1-3%.

In an aspect, nominal 1-mil blown films described herein can have a MD shrink at 300° F. (for 60 sec) in a range from about 65 to about 90%, from about 70 to about 90%, from about 70 to about 88%, or from about 74 to about 84%. Likewise, suitable ranges for TD shrink of the 1-mil film at 300° F. can include, but are not limited to, from about 2 to about 30%, from about 2 to about 25%, from about 3 to about 22%, or from about 5 to about 20%, and the like.

Beneficially, the ethylene polymers of this invention can result in film products have excellent heat sealing characteristics, such as low seal initiation temperatures. For example, nominal 1-mil films can have a seal initiation temperature (to achieve a minimum seal strength of 1.8 lb/in) of less than or equal to about 120° C., such as in a range from about 108 to about 118° C., in a range from about 108 to about 118° C., or in a range from about 112 to about 117° C.

Catalyst Systems and Polymerization Processes

In accordance with some aspects of the present invention, the olefin polymer (e.g., the ethylene polymer) can be produced using a dual catalyst system. In these aspects, catalyst component I can comprise any suitable transition metal imine phenolate complex or any transition metal imine phenolate complex disclosed herein. Catalyst component II can comprise any suitable bridged metallocene compound or any bridged metallocene compound disclosed herein. The catalyst system can comprise any suitable activator or any activator disclosed herein, and optionally, any suitable co-catalyst or any co-catalyst disclosed herein.

Catalyst component I can comprise, in particular aspects of this invention, a transition metal imine phenolate complex having formula (I):

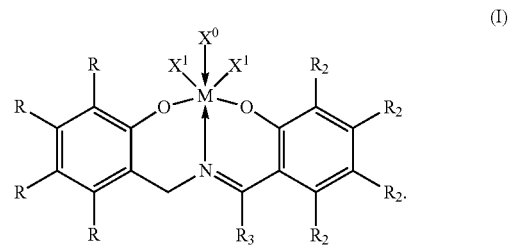

(I)

Within formula (I), M, each $X^1$, each R, each $R_2$, $R_3$, and $X^0$ are independent elements of the transition metal imine phenolate complex. Accordingly, the transition metal imine phenolate complex having formula (I) can be described using any combination of M, $X^1$, R, $R_2$, $R_3$, and $X^0$ disclosed herein.

Unless otherwise specified, formula (I) above, any other structural formulas disclosed herein, and any transition metal or metallocene complex, compound, or species disclosed herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

In accordance with aspects of this invention, the metal in formula (I), M, can be Ti, Zr, or Hf. In one aspect, for instance, M can be Zr or Hf, while in another aspect, M can be Ti; alternatively, M can be Zr; or alternatively, M can be Hf.

Each $X^1$ in formula (I) independently can be a monoanionic ligand. In some aspects, suitable monoanionic ligands can include, but are not limited to, H (hydride), $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, —$OBR^{12}$, or —$OSO_2R^1$, wherein $R^1$ is a $C_1$ to $C_{36}$ hydrocarbyl group. It is contemplated that each $X^1$ can be either the same or a different monoanionic ligand.

In one aspect, each $X^1$ independently can be H, $BH_4$, a halide (e.g., F, Cl, Br, etc.), a $C_1$ to $C_{18}$ hydrocarbyl group, a $C_1$ to $C_{18}$ hydrocarboxy group, a $C_1$ to $C_{18}$ hydrocarbylaminyl group, a $C_1$ to $C_{18}$ hydrocarbylsilyl group, or a $C_1$ to $C_{18}$ hydrocarbylaminylsilyl group. Alternatively, each $X^1$ independently can be H, $BH_4$, a halide, $OBR^{12}$, or $OSO_2R^1$, wherein $R^1$ is a $C_1$ to $C_{18}$ hydrocarbyl group. In another aspect, each $X^1$ independently can be H, $BH_4$, a halide, a $C_1$ to $C_{12}$ hydrocarbyl group, a $C_1$ to $C_{12}$ hydrocarboxy group, a $C_1$ to $C_{12}$ hydrocarbylaminyl group, a $C_1$ to $C_{12}$ hydrocarbylsilyl group, a $C_1$ to $C_{12}$ hydrocarbylaminylsilyl group, $OBR^{12}$, or $OSO_2R^1$, wherein $R^1$ is a $C_1$ to $C_{12}$ hydrocarbyl group. In another aspect, each $X^1$ independently can be H, $BH_4$, a halide, a $C_1$ to $C_{10}$ hydrocarbyl group, a $C_1$ to $C_{10}$ hydrocarboxy group, a $C_1$ to $C_{10}$ hydrocarbylaminyl group, a $C_1$ to $C_{10}$ hydrocarbylsilyl group, a $C_1$ to $C_{10}$ hydrocarbylaminylsilyl group, $OBR^{12}$, or $OSO_2R^1$, wherein $R^1$ is a $C_1$ to $C_{10}$ hydrocarbyl group. In yet another aspect, each $X^1$ independently can be H, $BH_4$, a halide, a $C_1$ to $C_8$ hydrocarbyl group, a $C_1$ to $C_8$ hydrocarboxy group, a $C_1$ to $C_8$ hydrocarbylaminyl group, a $C_1$ to $C_8$ hydrocarbylsilyl group, a $C_1$ to $C_8$ hydrocarbylaminylsilyl group, $OBR^{12}$, or $OSO_2R^1$, wherein $R^1$ is a $C_1$ to $C_8$ hydrocarbyl group. In still another aspect, each $X^1$ independently can be a halide or a $C_1$ to $C_{18}$ hydrocarbyl group. For example, each $X^1$ can be Cl.

In one aspect, each $X^1$ independently can be H, $BH_4$, a halide, or a $C_1$ to $C_{36}$ hydrocarbyl group, hydrocarboxy group, hydrocarbylaminyl group, hydrocarbylsilyl group, or hydrocarbylaminylsilyl group, while in another aspect, each $X^1$ independently can be H, $BH_4$, or a $C_1$ to $C_{18}$ hydrocarboxy group, hydrocarbylaminyl group, hydrocarbylsilyl group, or hydrocarbylaminylsilyl group. In yet another aspect, each $X^1$ independently can be a halide; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group. In still another aspect, each $X^1$ can be H; alternatively, F; alternatively, Cl; alternatively, Br; alternatively, I; alternatively, $BH_4$; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group.

Each $X^1$ independently can be, in some aspects, H, a halide, methyl, phenyl, benzyl, an alkoxy, an aryloxy, acetylacetonate, formate, acetate, stearate, oleate, benzoate, an alkylaminyl, a dialkylaminyl, a trihydrocarbylsilyl, or a hydrocarbylaminylsilyl; alternatively, H, a halide, methyl, phenyl, or benzyl; alternatively, an alkoxy, an aryloxy, or acetylacetonate; alternatively, an alkylaminyl or a dialkylaminyl; alternatively, a trihydrocarbylsilyl or hydrocarbylaminylsilyl; alternatively, H or a halide; alternatively, methyl, phenyl, benzyl, an alkoxy, an aryloxy, acetylacetonate, an alkylaminyl, or a dialkylaminyl; alternatively, H; alternatively, a halide; alternatively, methyl; alternatively, phenyl; alternatively, benzyl; alternatively, an alkoxy; alternatively, an aryloxy; alternatively, acetylacetonate; alternatively, an alkylaminyl; alternatively, a dialkylaminyl; alternatively, a trihydrocarbylsilyl; or alternatively, a hydrocarbylaminylsilyl. In these and other aspects, the alkoxy, aryloxy, alkylaminyl, dialkylaminyl, trihydrocarbylsilyl, and hydrocarbylaminylsilyl can be a $C_1$ to $C_{36}$, a $C_1$ to $C_{18}$, a $C_1$ to $C_{12}$, or a $C_1$ to $C_8$ alkoxy, aryloxy, alkylaminyl, dialkylaminyl, trihydrocarbylsilyl, and hydrocarbylaminylsilyl.

Moreover, each $X^1$ independently can be, in certain aspects, a halide or a $C_1$ to $C_{18}$ hydrocarbyl group; alternatively, a halide or a $C_1$ to $C_8$ hydrocarbyl group; alternatively, F, Cl, Br, I, methyl, benzyl, or phenyl; alternatively, Cl, methyl, benzyl, or phenyl; alternatively, a $C_1$ to $C_{18}$ alkoxy, aryloxy, alkylaminyl, dialkylaminyl, trihydrocarbylsilyl, or hydrocarbylaminylsilyl group; alternatively, a $C_1$ to $C_8$ alkoxy, aryloxy, alkylaminyl, dialkylaminyl, trihydrocarbylsilyl, or hydrocarbylaminylsilyl group; or alternatively, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, benzyl, naphthyl, trimethylsilyl, triisopropylsilyl, triphenylsilyl, or allyldimethylsilyl.

In formula (I), each R, each $R_2$, and $R_3$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. In some aspects, each R, each $R_2$, and $R_3$ independently can be H; alternatively, a halide; alternatively, a $C_1$ to $C_{18}$ hydrocarbyl group; alternatively, a $C_1$ to $C_{18}$ halogenated hydrocarbyl group; alternatively, a $C_1$ to $C_{18}$ hydrocarboxy group; alternatively, a $C_1$ to $C_{15}$ hydrocarbylsilyl group; alternatively, a $C_1$ to $C_{12}$ hydrocarbyl group or a $C_1$ to $C_{12}$ hydrocarbylsilyl group; or alternatively, a $C_1$ to $C_8$ alkyl group or a $C_3$ to $C_8$ alkenyl group. The halide, $C_1$ to $C_{36}$ hydrocarbyl group, $C_1$ to $C_{36}$ hydrocarboxy group, and $C_1$ to $C_{36}$ hydrocarbylsilyl group which can be a R, $R_2$, and $R_3$ substituent in formula (I) can be any halide, $C_1$ to $C_{36}$ hydrocarbyl group, $C_1$ to $C_{36}$ hydrocarboxy group, and $C_1$ to $C_{36}$ hydrocarbylsilyl group described herein (e.g., as pertaining to $X^1$ in formula (I)). Independently, each R, each $R_2$, and $R_3$ formula (I) can be, in certain aspects, a $C_1$ to $C_{36}$ halogenated hydrocarbyl group, where the halogenated hydrocarbyl group indicates the presence of one or more halogen atoms replacing an equivalent number of hydrogen atoms in the hydrocarbyl group. The halogenated hydrocarbyl group often can be a halogenated alkyl group, a halogenated alkenyl group, a halogenated cycloalkyl group, a halogenated aryl group, or a halogenated aralkyl group. Representative and non-limiting halogenated hydrocarbyl groups include pentafluorophenyl, trifluoromethyl ($CF_3$), and the like.

As a non-limiting example, each R, each $R_2$, and $R_3$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group (or other substituted aryl group), a benzyl group, a naphthyl group, a trimethylsilyl group, a triisopropylsilyl group, a triphenylsilyl group, or an allyldimethylsilyl group; alternatively, H; alternatively, Cl; alternatively, $CF_3$; alternatively, a methyl group; alternatively, an ethyl group; alternatively, a propyl group; alternatively, a butyl group; alternatively, a pentyl group; alternatively, a hexyl group; alternatively, a heptyl group; alternatively, an octyl group, a nonyl group; alternatively, a decyl group; alternatively, an ethenyl group; alternatively, a propenyl group; alternatively, a butenyl group; alternatively, a pentenyl group; alternatively, a hexenyl group; alternatively, a heptenyl group; alternatively, an octenyl group; alternatively, a nonenyl group; alternatively, a decenyl group; alternatively, a phenyl group; alternatively, a tolyl group; alternatively, a benzyl group; alternatively, a naphthyl group; alternatively, a trimethylsilyl group; alternatively, a triisopropylsilyl group; alternatively, a triphenylsilyl group; or alternatively, an allyldimethylsilyl group.

$X^0$ in formula (I) is an optional neutral ligand, and therefore, the transition metal imine phenolate complex can have no neutral ligand, or the transition metal imine phenolate complex can have one neutral ligand, or the transition metal imine phenolate complex can have two neutral ligands. In an aspect, suitable neutral ligands can include sigma-donor solvents that contain a coordinating atom (or atoms) that can coordinate to the transition metal atom in formula (I). Examples of suitable coordinating atoms in the neutral ligands can include, but are not limited to, O, N, S, and P, or combinations of these atoms. Unless otherwise specified, the neutral ligand can be unsubstituted or can be substituted. Substituent groups are independently described herein and can be utilized, without limitation to further describe a neutral ligand which can be utilized as $X^0$ in formula (I). In some aspects, the neutral ligand can be a Lewis base. When the two neutral ligands are present, it is contemplated that the two neutral ligands can be either the same or different.

In an aspect, each neutral ligand independently can be an ether, an organic carbonyl, a thioether, an amine, a nitrile, or a phosphine. In another aspect, each neutral ligand independently can be an acyclic ether, a cyclic ether, an acyclic organic carbonyl, a cyclic organic carbonyl, an acyclic thioether, a cyclic thioether, a nitrile, an acyclic amine, a cyclic amine, an acyclic phosphine, or a cyclic phosphine.

Suitable ethers which can be utilized as a neutral ligand, either alone or in combination, can include, but are not limited to, dimethyl ether, diethyl ether, dipropyl ether, dibutyl ether, methyl ethyl ether, methyl propyl ether, methyl butyl ether, diphenyl ether, ditolyl ether, tetrahydrofuran, 2-methyltetrahydrofuran, 2,5-dimethyltetrahydrofuran, 2,3-dihydrofuran, 2,5-dihydrofuran, furan, benzofuran, isobenzofuran, dibenzofuran, tetrahydropyran, 3,4-dihydro-2H-pyran, 3,6-dihydro-2H-pyran, 2H-pyran, 4H-pyran, 1,3-dioxane, 1,4-dioxane, morpholine, and the like, including substituted derivatives thereof.

Suitable organic carbonyls included ketones, aldehydes, esters, and amides which can be utilized as a neutral ligand, either alone or in combination, and illustrative examples can include, but are not limited to, acetone, acetophonone, benzophenone, N,N-dimethylformamide, N,N-dimethylacetamide, methyl acetate, ethyl acetate, and the like, including substituted derivatives thereof.

Suitable thioethers which can be utilized as a neutral ligand, either alone or in combination, can include, but are not limited to, dimethyl thioether, diethyl thioether, dipropyl thioether, dibutyl thioether, methyl ethyl thioether, methyl propyl thioether, methyl butyl thioether, diphenyl thioether, ditolyl thioether, thiophene, benzothiophene, tetrahydrothiophene, thiane, and the like, including substituted derivatives thereof.

Suitable nitriles which can be utilized as a neutral ligand, either alone or in combination, can include, but are not limited to, acetonitrile, propionitrile, butyronitrile, benzonitrile, 4-methylbenzonitrile, and the like, including substituted derivatives thereof.

Suitable amines which can be utilized as a neutral ligand, either alone or in combination, can include, but are not limited to, methyl amine, ethyl amine, propyl amine, butyl amine, dimethyl amine, diethyl amine, dipropyl amine, dibutyl amine, trimethyl amine, triethyl amine, tripropyl amine, tributyl amine, aniline, diphenylamine, triphenylamine, tolylamine, xylylamine, ditolylamine, pyridine, quinoline, pyrrole, indole, 2-methylpyridine, 3-methylpyridine, 4-methylpyridine, 2,5-dimethylpyrrole, 2,5-diethylpyrrole, 2,5-dipropylpyrrole, 2,5-dibutylpyrrole, 2,4-dimethylpyrrole, 2,4-diethylpyrrole, 2,4-dipropylpyrrole, 2,4-dibutylpyrrole, 3,4-dimethylpyrrole, 3,4-diethylpyrrole, 3,4-dipropylpyrrole, 3,4-dibutylpyrrole, 2-methylpyrrole, 2-ethylpyrrole, 2-propylpyrrole, 2-butylpyrrole, 3-methylpyrrole, 3-ethylpyrrole, 3-propylpyrrole, 3-butylpyrrole, 3-ethyl-2,4-dimethylpyrrole, 2,3,4,5-tetramethylpyrrole, 2,3,4,5-tetraethylpyrrole, and the like, including substituted derivatives thereof. Suitable amines can be primary amines, secondary amines, or tertiary amines.

Suitable phosphines which can be utilized as a neutral ligand, either alone or in combination, can include, but are not limited to, trimethylphosphine, triethylphosphine, tripropylphosphine, tributylphosphine, phenylphosphine, tolylphosphine, diphenylphosphine, ditolylphosphine, triphenylphosphine, tritolylphosphine, methyldiphenylphosphine, dimethylphenylphosphine, ethyldiphenylphosphine, diethylphenylphosphine, and the like, including substituted derivatives thereof.

In some aspects, each neutral ligand independently can be tetrahydrofuran, diethyl ether, acetonitrile, pyridine, dimethyl amine, diethyl amine, trimethyl amine, trimethylphosphine, or triphenylphosphine. In other aspects, each neutral ligand can be tetrahydrofuran; alternatively, diethyl ether; alternatively, acetonitrile; alternatively, pyridine; alternatively, dimethyl amine; alternatively, diethyl amine; alternatively, trimethyl amine; alternatively, trimethylphosphine; or alternatively, triphenylphosphine. Suitable neutral ligands are not limited to the neutral ligands described herein; other suitable neutral ligands are disclosed in U.S. Pat. No. 8,618,229, which is incorporated herein by reference in its entirety.

Catalyst component I is not limited solely to transition metal imine phenolate complexes such as described herein. Other suitable transition metal imine phenolate complexes are disclosed in U.S. Pat. Nos. 8,877,672, 8,895,679, 8,937,139, and 9,034,991, which are incorporated herein by reference in their entirety.

Moreover, catalyst component I can comprise a transition metal bis(phenolate) compound in other aspects of this invention, such as disclosed in U.S. Pat. No. 9,394,387, which is incorporated herein by reference in its entirety. Thus, the olefin polymers (e.g., the ethylene polymers) disclosed herein can be produced using a dual catalyst system that comprises catalyst component I comprising any suitable transition metal bis(phenolate) compound, catalyst component II comprising any suitable bridged metallocene compound, any suitable activator, and optionally, any suitable co-catalyst.

Generally, catalyst component II can comprise a bridged metallocene compound. In one aspect, for instance, catalyst component II can comprise a bridged zirconium or hafnium based metallocene compound. In another aspect, catalyst component II can comprise a bridged zirconium or hafnium based metallocene compound with an alkenyl substituent. In yet another aspect, catalyst component II can comprise a bridged zirconium or hafnium based metallocene compound with an alkenyl substituent and a fluorenyl group. In still another aspect, catalyst component II can comprise a bridged zirconium or hafnium based metallocene compound with a cyclopentadienyl group and a fluorenyl group, and with an alkenyl substituent on the bridging group and/or on the cyclopentadienyl group.

In some aspects, catalyst component II can comprise a bridged metallocene compound having an alkyl and/or aryl group substituent on the bridging group, while in other aspects, catalyst component II can comprise a dinuclear bridged metallocene compound with an alkenyl linking group.

Catalyst component II can comprise, in particular aspects of this invention, a bridged metallocene compound having formula (II):

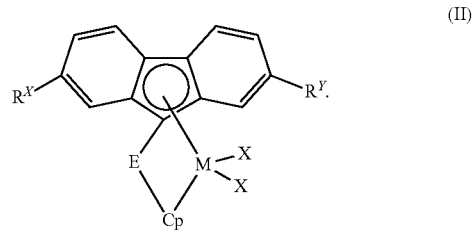

Within formula (II), M, Cp, $R^X$, $R^Y$, E, and each X are independent elements of the bridged metallocene compound. Accordingly, the bridged metallocene compound having formula (II) can be described using any combination of M, Cp, $R^X$, $R^Y$, E, and X disclosed herein.

The selections for M and each X in formula (II) are the same as those described herein above for M and $X^1$ in formula (I), respectively. In formula (II), Cp can be a cyclopentadienyl, indenyl, or fluorenyl group. In one aspect, Cp can be a substituted cyclopentadienyl group, while in another aspect, Cp can be a substituted indenyl group.

In some aspects, Cp can contain no additional substituents, e.g., other than bridging group E, discussed further herein below. In other aspects, Cp can be further substituted with one substituent, two substituents, three substituents, four substituents, and so forth. If present, each substituent on Cp independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on Cp can be either the same or a different substituent group. Moreover, each substituent can be at any position on the respective cyclopentadienyl, indenyl, or fluorenyl ring structure that conforms with the rules of chemical valence. In general, any substituent on Cp, independently, can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group described herein (e.g., as pertaining to R, $R_2$, and $R_3$ substituents in formula (I)).

In one aspect, for example, each substituent on Cp independently can be a $C_1$ to $C_{12}$ hydrocarbyl group or a $C_1$ to $C_{12}$ hydrocarbylsilyl group. In another aspect, each substituent on Cp independently can be a $C_1$ to $C_8$ alkyl group or a $C_3$ to $C_8$ alkenyl group. In yet another aspect, each substituent on Cp independently can be H, Cl, $CF_3$, a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group.

Similarly, $R^X$ and $R^Y$ in formula (II) independently can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein (e.g., as pertaining to R, $R_2$, and $R_3$ substituents in formula (I)). In one aspect, for example, $R^X$ and $R^Y$ independently can be H or a $C_1$ to $C_{12}$ hydrocarbyl group. In another aspect, $R^X$ and $R^Y$ independently can be a $C_1$ to $C_{10}$ hydrocarbyl group. In yet another aspect, $R^X$ and $R^Y$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group, and the like. In still another aspect, $R^X$ and $R^Y$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, or a benzyl group.

Bridging group E in formula (II) can be (i) a bridging group having the formula $>E^AR^AR^B$, wherein $E^A$ can be C, Si, or Ge, and $R^A$ and $R^B$ independently can be H or a $C_1$ to $C_{18}$ hydrocarbyl group; (ii) a bridging group having the formula $—CR^CR^D—CR^ER^F—$, wherein $R^C$, $R^D$, $R^E$, and $R^F$ independently can be H or a $C_1$ to $C_{18}$ hydrocarbyl group; or (iii) a bridging group having the formula $—SiR^GR^H-E^5R^IR^J—$, wherein $E^5$ can be C or Si, and $R^G$, $R^H$, $R^I$, and $R^J$ independently can be H or a $C_1$ to $C_{18}$ hydrocarbyl group.

In the first option, the bridging group E can have the formula $>E^AR^AR^B$, wherein $E^A$ can be C, Si, or Ge, and $R^A$ and $R^B$ independently can be H or any $C_1$ to $C_{18}$ hydrocarbyl group disclosed herein. In some aspects of this invention, $R^A$ and $R^B$ independently can be a $C_1$ to $C_{12}$ hydrocarbyl group; alternatively, $R^A$ and $R^B$ independently can be a $C_1$ to $C_8$ hydrocarbyl group; alternatively, $R^A$ and $R^B$ independently can be a phenyl group, a $C_1$ to $C_8$ alkyl group, or a $C_3$ to $C_8$ alkenyl group; alternatively, $R^A$ and $R^B$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group; or alternatively, $R^A$ and $R^B$ independently can be a methyl group, an ethyl group, a propyl group, a butyl group, a pentyl group, a hexyl group, a propenyl group, a butenyl group, a pentenyl group, a hexenyl group, a phenyl group, or a benzyl group. In these and other aspects, $R^A$ and $R^B$ can be either the same or different.

In the second option, the bridging group E can have the formula $—CR^CR^D—CR^ER^F—$, wherein $R^C$, $R^D$, $R^E$, and $R^F$ independently can be H or any $C_1$ to $C_{18}$ hydrocarbyl group disclosed herein. For instance, $R^C$, $R^D$, $R^E$, and $R^F$ independently can be H or a methyl group.

In the third option, the bridging group E can have the formula $—SiR^GR^H-E^5R^IR^J—$, wherein $E^5$ can be C or Si, and $R^G$, $R^H$, $R^I$, and $R^J$ independently can be H or any $C_1$ to $C_{18}$ hydrocarbyl group disclosed herein. For instance, $E^5$ can be Si, and $R^G$, $R^H$, $R^I$, and $R^J$ independently can be H or a methyl group.

Illustrative and non-limiting examples of bridged metallocene compounds having formula (II) and/or suitable for use as catalyst component II can include the following compounds (Me=methyl, Ph=phenyl; t-Bu=tert-butyl):

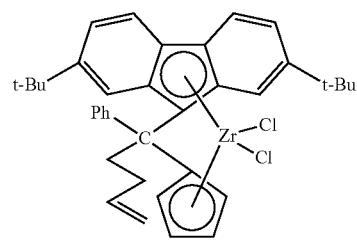

(14)

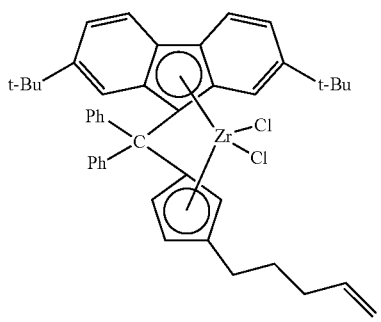

(15)

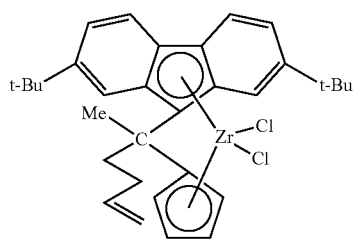
(16)
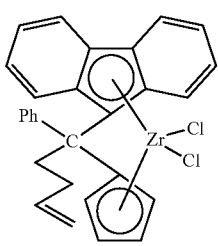
(17)
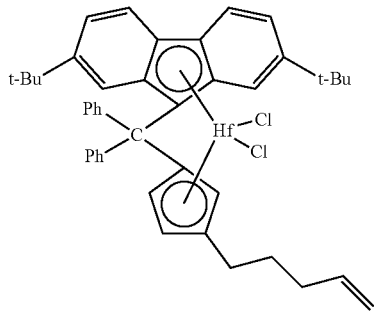
(18)
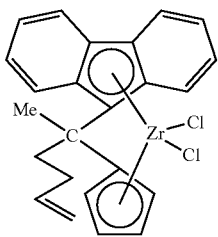
(19)
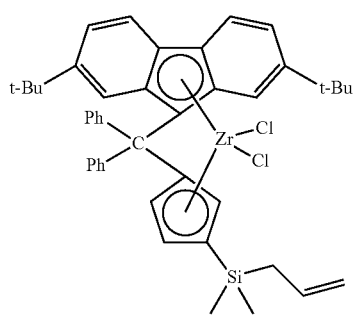
(20)
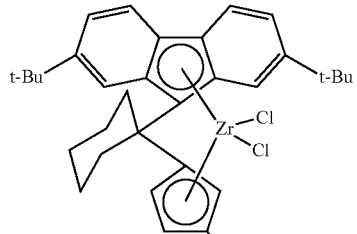
(21)
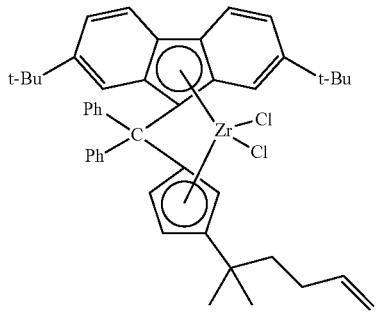
(22)
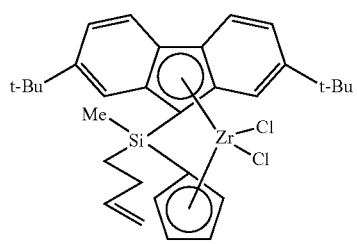
(23)
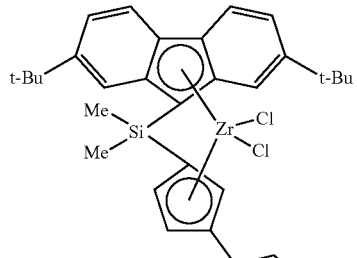
(24)
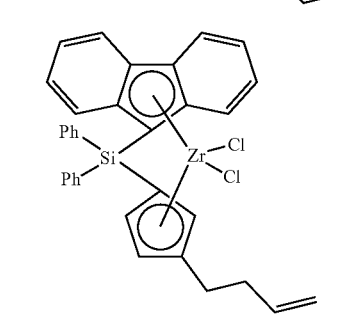
(25)
and the like, as well as combinations thereof.
Catalyst component II is not limited solely to the bridged metallocene compounds such as described above. Other suitable bridged metallocene compounds are disclosed in U.S. Pat. Nos. 7,026,494, 7,041,617, 7,226,886, 7,312,283, 7,517,939, and 7,619,047, which are incorporated herein by reference in their entirety.

According to an aspect of this invention, the weight ratio of catalyst component I to catalyst component II in the catalyst composition can be in a range from about 10:1 to about 1:10, from about 8:1 to about 1:8, from about 5:1 to about 1:5, from about 4:1 to about 1:4, from about 3:1 to about 1:3; from about 2:1 to about 1:2, from about 1.5:1 to about 1:1.5, from about 1.25:1 to about 1:1.25, or from about 1.1:1 to about 1:1.1.

Additionally, the dual catalyst system contains an activator. For example, the catalyst system can contain an activator-support, an aluminoxane compound, an organoboron or organoborate compound, an ionizing ionic compound, and the like, or any combination thereof. The catalyst system can contain one or more than one activator.

In one aspect, the catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. In another aspect, the catalyst system can comprise an aluminoxane compound. In yet another aspect, the catalyst system can comprise an organoboron or organoborate compound. In still another aspect, the catalyst system can comprise an ionizing ionic compound.

In other aspects, the catalyst system can comprise an activator-support, for example, an activator-support comprising a solid oxide treated with an electron-withdrawing anion. Examples of such materials are disclosed in, for instance, U.S. Pat. Nos. 7,294,599, 7,601,665, 7,884,163, 8,309,485, 8,623,973, and 9,023,959, which are incorporated herein by reference in their entirety. For instance, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, or phosphated silica-coated alumina, and the like, as well as any combination thereof. In some aspects, the activator-support can comprise a fluorided solid oxide and/or a sulfated solid oxide.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides, sulfated solid oxides, etc.) are well known to those of skill in the art.

The present invention can employ catalyst compositions containing catalyst component I, catalyst component II, an activator (one or more than one), and optionally, a co-catalyst. When present, the co-catalyst can include, but is not limited to, metal alkyl, or organometal, co-catalysts, with the metal encompassing boron, aluminum, and the like. Optionally, the catalyst systems provided herein can comprise a co-catalyst, or a combination of co-catalysts. For instance, alkyl boron and/or alkyl aluminum compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof. Accordingly, in an aspect of this invention, the dual catalyst composition can comprise catalyst component I, catalyst component II, an activator-support, and an organoaluminum compound.

In another aspect of the present invention, a catalyst composition is provided which comprises catalyst component I, catalyst component II, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, discussed herein, in the absence of these additional materials. For example, a catalyst composition of the present invention can consist essentially of catalyst component I, catalyst component II, an activator-support, and an organoaluminum compound, wherein no other materials are present in the catalyst composition which would increase/decrease the activity of the catalyst composition by more than about 10% from the catalyst activity of the catalyst composition in the absence of said materials.

Catalyst compositions of the present invention generally have a catalyst activity greater than about 100 grams of ethylene polymer (homopolymer and/or copolymer, as the context requires) per gram of activator-support per hour (abbreviated g/g/hr). In another aspect, the catalyst activity can be greater than about 150, greater than about 250, or greater than about 500 g/g/hr. In still another aspect, catalyst compositions of this invention can be characterized by having a catalyst activity greater than about 550, greater than about 650, or greater than about 750 g/g/hr. Yet, in another aspect, the catalyst activity can be greater than about 1000 g/g/hr, greater than about 2000 g/g/hr, or greater than about 5000 g/g/hr, and often as high as 8000-15,000 g/g/hr. Illustrative and non-limiting ranges for the catalyst activity include from about 500 to about 10,000, from about 750 to about 7,500, or from about 1,000 to about 5,000 g/g/hr, and the like. These activities are measured under slurry polymerization conditions, with a triisobutylaluminum co-catalyst, using isobutane as the diluent, at a polymerization temperature of about 80° C. and a reactor pressure of about 320 psig. Moreover, in some aspects, the activator-support can comprise sulfated alumina, fluorided silica-alumina, or fluorided silica-coated alumina, although not limited thereto.

This invention further encompasses methods of making these catalyst compositions, such as, for example, contacting the respective catalyst components in any order or sequence. In one aspect, for example, the catalyst composition can be produced by a process comprising contacting, in any order, catalyst component I, catalyst component II, and the activator, while in another aspect, the catalyst composition can be produced by a process comprising contacting, in any order, catalyst component I, catalyst component II, the activator, and the co-catalyst.

Olefin polymers (e.g., ethylene polymers) can be produced from the disclosed catalyst systems using any suitable olefin polymerization process using various types of polymerization reactors, polymerization reactor systems, and polymerization reaction conditions. One such olefin polymerization process can process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise, as disclosed herein, catalyst component I, catalyst component II, an activator, and an optional co-catalyst. This invention also encompasses any olefin polymers (e.g., ethylene polymers) produced by any of the polymerization processes disclosed herein.

As used herein, a "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can be within a range from about 70° C. to about 100° C., or from about 75° C. to about 95° C.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages to the polymerization reaction process.

Olefin monomers that can be employed with catalyst compositions and polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight. Polymer density was determined in grams per cubic centimeter (g/cm³) on a compression molded sample, cooled at about 15° C. per hour, and conditioned for about 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 μL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve). The IB parameter was determined from the molecular weight distribution curve (plot of dW/d(Log M) vs. Log M; normalized to an area equal to 1), and is defined as $1/[dW/d(Log\ M)]_{MAX}$.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\eta_\tau$, and the breadth parameter—a (CY-a parameter). The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: $|\eta^*(\omega)|$=magnitude of complex shear viscosity;
$\eta_0$=zero shear viscosity;
$\tau_\eta$=viscous relaxation time (Tau($\eta$));
a="breadth" parameter (CY-a parameter);
n=fixes the final power law slope, fixed at 2/11; and
$\omega$=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics*, 2nd Edition, John Wiley & Sons (1987); each of which is incorporated herein by reference in its entirety.

The ATREF procedure was as follows. Forty mg of the polymer sample and 20 mL of 1,2,4-trichlorobenzene (TCB) were sequentially charged into a vessel on a PolyChar TREF 200+instrument. After dissolving the polymer, an aliquot (500 microliters) of the polymer solution was loaded on the column (stainless steel shots) at 150° C. and cooled at 0.5° C./min to 35° C. Then, the elution was begun with a 0.5 mL/min TCB flow rate and heating at 1° C./min up to 120° C., and analyzing with an IR detector. The peak ATREF temperature is the location, in temperature, of the highest point of the ATREF curve.

Sulfated alumina activator-supports were prepared as follows. Bohemite was obtained from W.R. Grace & Company under the designation "Alumina A." This material was impregnated to incipient wetness with an aqueous solution of ammonium sulfate to equal about 15% sulfate. This mixture was then placed in a flat pan and allowed to dry under vacuum at approximately 110° C. for about 16 hours. To calcine the resultant powdered mixture, the material was fluidized in a stream of dry air at about 550° C. for about 6 hours. Afterward, the sulfated alumina was collected and stored under dry nitrogen, and was used without exposure to the atmosphere.

The structures for CAT 1 and CAT 2, used in Examples 1-8, are shown below (Me=methyl; Et=ethyl; tBu=tert-butyl):

CAT 1

CAT 2

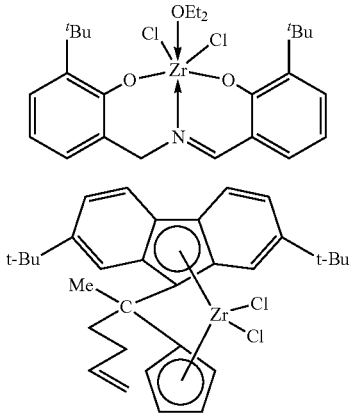

Examples 1-3 were produced using the following polymerization procedure. The polymerization runs were conducted in a one-gallon stainless steel reactor, and isobutane (2 L) was used in all runs. Under an isobutane purge, the organoaluminum compound (0.3 mL of 1M TIBA in heptanes), the activator-support (sulfated alumina, SA), CAT 1, and CAT 2 were added in that order through a charge port while slowly venting isobutane vapor. The charge port was closed and isobutane was added. The contents of the reactor were stirred and heated to the desired run temperature of about 80° C., and ethylene and 1-hexene were then introduced into the reactor. Hydrogen was added from a 325 cc auxiliary vessel. Ethylene was fed on demand to maintain the target pressure of 320 psig pressure for the 30 minute length of the polymerization run. The reactor was maintained at the desired temperature throughout the run by an automated heating-cooling system. After venting of the reactor, purging, and cooling, the resulting polymer product was dried under reduced pressure.

Pilot plant polymerizations were conducted for Examples 4-8 in a 30-gallon slurry loop reactor at a production rate of approximately 30 pounds of polymer per hour. Polymerization runs were carried out under continuous particle form process conditions in a loop reactor (also referred to as a slurry process) by contacting CAT 1, CAT 2, a triisobutylaluminum (TIBA) solution, and an activator-support (sulfated alumina) in a 1-L stirred autoclave (30 min residence time) with output to the loop reactor.

Ethylene used was polymerization grade ethylene which was purified through a column of AZ 300 (activated at 300-500° F. in nitrogen). 1-Hexene was polymerization grade 1-hexene (obtained from Chevron Phillips Chemical Company) which was purified by nitrogen purging and storage over AZ 300 activated at 300-500° F. in nitrogen. Liquid isobutane was used as the diluent.

Certain polymerization conditions for Examples 4-8 are provided in Table I below (mole % ethylene and ppm by weight of triisobutylaluminum (TIBA) and sulfated alumina (SA) are based on isobutane diluent). The polymerization conditions also included a reactor pressure of 590 psig, a polymerization temperature of 90° C., a feed rate of 37-43 lb/hr ethylene, and 5-7.5 ppm total of CAT 1 and CAT 2 (based on the weight of isobutane diluent).

TABLE I

Examples 4-8 - Polymerization Conditions.

| Example | 1-Hexene (lb/hr) | $H_2$ (mlb/hr) | SA (ppm) | Weight ratio CAT 1/ CAT 2 | $C_2H_4$ (mole %) | TIBA ppm |
|---|---|---|---|---|---|---|
| 4 | 5.4 | 2.9 | 427 | 3.2 | 12.9 | 175 |
| 5 | 5.2 | 2.9 | 436 | 1.9 | 11.5 | 170 |
| 6 | 4.9 | 2.9 | 500 | 1.5 | 11.7 | 174 |
| 7 | 5.5 | 4.0 | 502 | 1.5 | 12.9 | 191 |
| 8 | 5.4 | 4.0 | 500 | 1.1 | 11.7 | 178 |

Blown film samples at a 1-mil thickness (25 microns) were made on a laboratory-scale blown film line using typical linear low density polyethylene conditions (LLDPE) as follows: 100 mm (4 inch) die diameter, 1.5 mm (0.060 inch) die gap, 37.5 mm (1.5 inch) diameter single-screw extruder fitted with a barrier screw with a Maddock mixing section at the end (L/D=24, 2.2:1 compression ratio), about 27 kg/hr (60 lb/hr) output rate, 2.5:1 blow-up ratio (BUR), "in-pocket" bubble with a "frost line height" (FLH) of about 28 cm (11 inch), and 190° C. (375° F.) barrel and die set temperatures. Cooling was accomplished with a Dual Lip air ring using ambient (laboratory) air at about 25° C. (75-80°

F.). These particular processing conditions were chosen because the film properties so obtained are typically representative of those obtained from larger, commercial scale film blowing conditions.

Dart impact strength was measured in accordance with ASTM D1709 (method A). Machine (MD) and transverse (TD) direction Elmendorf tear strengths were measured on a Testing Machines Inc. tear tester (Model 83-11-00) in accordance with ASTM D1922. Film haze was determined in accordance with ASTM D1003, film shrink properties were determined in accordance with ASTM D2732 at 300° F. and 60 seconds, and seal initiation testing was determined in accordance with ASTM F88.

Examples 1-14

Examples 1-8 were produced as described above. Comparative Examples 9-11 and 13-14 were commercially-available LLDPE (ethylene copolymer) resins from Chevron-Phillips Chemical Company LP, while Comparative Example 12 was a commercially-available LLDPE (ethylene copolymer) resin from The Dow Chemical Company.

Table II summarizes certain information relating to the polymerization experiments of Examples 1-3 using dual catalyst systems containing a transition metal imine phenolate complex (CAT 1) and a metallocene compound (CAT 2). The respective amounts of CAT 1, CAT 2, sulfated alumina, hydrogen, and 1-hexene are shown in Table II, as well as the weight of the polymer produced. Table II also lists the melt index, density, zero-shear viscosity, CY-a parameter, and certain molecular weight characteristics of the polymers of Examples 1-3. FIG. 1 illustrates the molecular weight distributions (amount of polymer versus the logarithm of molecular weight) for the polymers of Examples 1-3 and 9. As compared to Example 9 (produced using a single metallocene catalyst), Examples 1-3 had a relatively similar narrow molecular weight distribution, but with tails on both the low molecular weight and high molecular weight ends of the molecular weight distribution curves. This difference can be quantified by the IB parameter.

Table III summarizes the zero-shear viscosity, CY-a parameter, and molecular weight characteristics of the polymers of Examples 4-12. Generally, the polymers of Examples 1-8 had Mw values in the ~107,000-140,000 g/mol range, Mz/Mw values in the ~1.9-6.3 range, and CY-a values in the 0.20-0.43 range, while the polymer of Example 9 had a Mz/Mw value of 1.68 and a CY-a value of 0.618. The polymers of Examples 4-8, as shown in Table III and unexpectedly, had values of the IB parameter in the ~0.97-1.0 range, while the polymers of Example 9 and Example 12 had IB values, respectively, of 0.89 and 1.13.

FIGS. 2-10 illustrate the ATREF profiles of the polymers of Examples 4-12, respectively, and certain information from the ATREF profiles is summarized in Table IV. As shown by the figures and table, the polymers of Example 4-8 had significantly different ATREF profiles, as compared to the polymers having the most similar polymer properties (Examples 9 and 12). Surprisingly, for Examples 4-8, greater than 50 wt. % of the polymer was eluted between 40° C. and 76° C., ~29-35 wt. % was eluted between 76° C. and 86° C., and ~12-15 wt. % was eluted above a temperature of 86° C. Moreover, the polymers of Examples 4-8 has predominantly one ATREF peak with a peak ATREF temperature in the ~72-75° C. range, and no other significant peaks, as compared to the polymers of Examples 9 and 12, which had large peaks at temperatures of 84° C. and above.

Table V summarizes the melt index, density, and certain extrusion processing and film properties of Examples 4-5, 7-11, and 13-14. The films of Examples 4-5 and 7-8 had dart impacts, MD tear strengths, seal initiation temperatures, and haze values that were generally similar to those of Examples 9 and 13-14, but the films of Examples 4-5 and 7-8 also had higher TD tear strengths and MD shrink values. Moreover, the polymers of Examples 4-5 and 7-8 processed easier than those of Examples 9 and 13-14, as evidenced by the lower extrusion amps and head pressures at equivalent output rates. Despite these processing advantages (typically associated with broader molecular weight distributions), unexpectedly, there was no reduction in clarity, as shown by the very low haze values (3-5%) for the films of Examples 4-5 and 7-8. Thus, these polymers offer a beneficial combination of (i) properties normally associated with metallocene LLDPE's (good MD tear strength and dart impact, low seal initiation temperature), (ii) but with improved MD shrink, TD tear strength, and extrusion processability, (iii) and with no sacrifice in optical properties.

Figure 11:
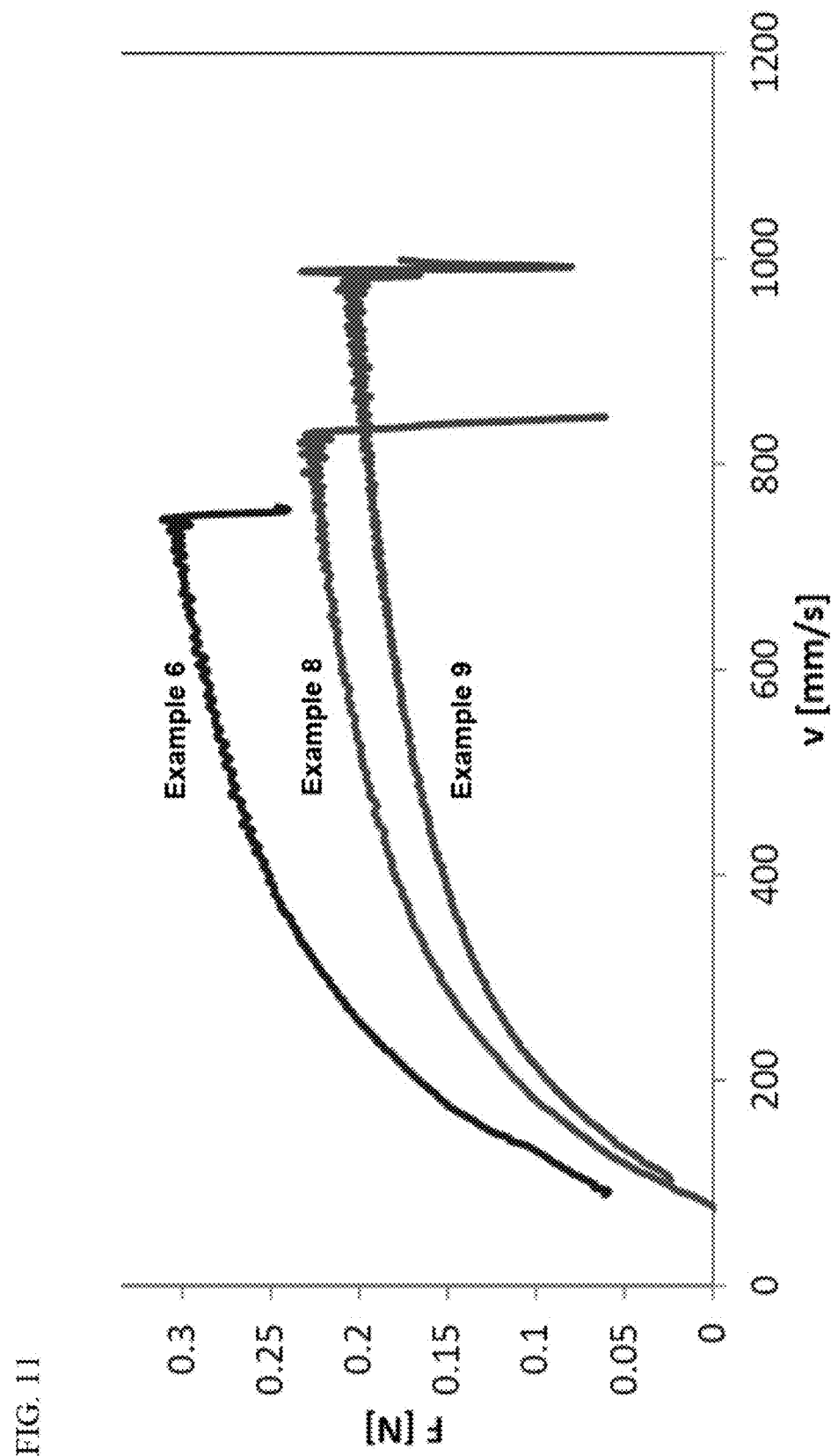
FIG. 11 presents a plot of force (N) versus the drawdown speed (mm/sec) for the polymers of Examples 6 and 8-9.

FIG. 11 illustrates the drawdown ability and melt tension/strength of the polymers of Examples 6, 8, and 9. Notwithstanding the broader molecular weight distributions of the polymers of Examples 6 and 8, these polymers had drawdown performance that approached that of the polymer of Example 9, which had a narrower molecular weight distribution. Thus, the polymers of this invention can be used in thin film or downgauged film applications. Additionally, the higher force prior to break—as shown by Examples 6 and 8—can translate to improved bubble stability in blown film applications, versus typical metallocene-catalyzed LLDPE copolymers.

TABLE II

| | Examples 1-3. | | | | | | | |
|---|---|---|---|---|---|---|---|---|
| Example | CAT 1 (mg) | CAT 2 (mg) | SA (mg) | Polymer (g) | Hydrogen (ppm) | 1-hexene (g) | MI (g/10 min) | Density (g/cc) |
| 1 | 1.3 | 2.25 | 212 | 212 | 170 | 40 | 0.84 | 0.916 |
| 2 | 1.3 | 2.25 | 210 | 230 | 170 | 38 | 1.08 | 0.918 |
| 3 | 1.3 | 2.25 | 220 | 187 | 220 | 37 | 1.20 | 0.916 |

| Example | Mn/1000 (g/mol) | Mw/1000 (g/mol) | Mz/1000 (g/mol) | Mv/1000 (g/mol) | Mp/1000 (g/mol) | Mw/Mn | IB | $\eta_o$ (Pa·s) | CY-a |
|---|---|---|---|---|---|---|---|---|---|
| 1 | 40.7 | 122.2 | 345.1 | 106.8 | 93.7 | 3.0 | 0.976 | 1.56E+04 | 0.251 |
| 2 | 39.6 | 107.7 | 243.5 | 96.0 | 84.7 | 2.7 | 0.966 | 1.21E+04 | 0.268 |
| 3 | 36.2 | 115.9 | 392.2 | 100.4 | 81.9 | 3.2 | 0.971 | 1.05E+04 | 0.247 |

TABLE III

Examples 4-12 - Molecular Weight Properties
(molecular weights in g/mol).

| Example | Mn/1000 | Mw/1000 | Mz/1000 | Mv/1000 | Mp/1000 |
|---|---|---|---|---|---|
| 4 | 42.2 | 109.6 | 216.5 | 98.9 | 90.5 |
| 5 | 43.3 | 117.7 | 286.3 | 104.8 | 90.5 |
| 6 | 42.1 | 139.8 | 882.5 | 116.3 | 91.6 |
| 7 | 37.7 | 112.6 | 372.3 | 98.4 | 84.9 |
| 8 | 38.0 | 119.7 | 523.0 | 103.1 | 86.0 |
| 9 | 54.3 | 119.3 | 200.4 | 109.8 | 103.0 |
| 10 | 11.8 | 193.5 | 1231.8 | 144.1 | 84.9 |
| 11 | 32.3 | 150.2 | 470.1 | 125.8 | 84.9 |
| 12 | 46.8 | 126.5 | 250.1 | 113.0 | 96.3 |

| Example | Mw/Mn | Mz/Mw | IB | IVc | $\eta_o$ (Pa·s) | CY-a |
|---|---|---|---|---|---|---|
| 4 | 2.60 | 1.98 | 0.972 | 1.67 | 4.90E+03 | 0.424 |
| 5 | 2.72 | 2.43 | 0.974 | 1.74 | 7.95E+03 | 0.296 |

TABLE III-continued

Examples 4-12 - Molecular Weight Properties
(molecular weights in g/mol).

| 6 | 3.32 | 6.31 | 0.993 | 1.88 | 1.48E+04 | 0.208 |
|---|---|---|---|---|---|---|
| 7 | 2.98 | 3.31 | 0.994 | 1.67 | 5.88E+03 | 0.291 |
| 8 | 3.15 | 4.37 | 0.991 | 1.72 | 8.43E+03 | 0.247 |
| 9 | 2.20 | 1.68 | 0.890 | 1.80 | 4.83E+03 | 0.618 |
| 10 | 16.41 | 6.37 | 1.695 | 2.20 | 6.31E+05 | 0.176 |
| 11 | 4.66 | 3.13 | 1.329 | 1.99 | — | — |
| 12 | 2.70 | 1.98 | 1.136 | 1.84 | 1.11E+04 | 0.418 |

TABLE IV

Examples 4-12 - ATREF Properties.

| Example | <40° C. (wt. %) | 40-76° C. (wt. %) | 76-86° C. (wt. %) | >86° C. (wt. %) |
|---|---|---|---|---|
| 4 | 0.5 | 50.5 | 35 | 14 |
| 5 | 0.3 | 54.7 | 32 | 13 |
| 6 | 1 | 55 | 29 | 15 |
| 7 | 1 | 55 | 31 | 14 |
| 8 | 1 | 56 | 30 | 13 |
| 9 | 1 | 36 | 42 | 21 |
| 10 | 12 | 25 | 16 | 47 |
| 11 | 19 | 21 | 11 | 49 |
| 12 | 1 | 49 | 17 | 33 |

| Example | $1^{st}$ Peak Temp. (° C.) | $2^{nd}$ Peak Temp. (° C.) | $3^{rd}$ Peak Temp. (° C.) |
|---|---|---|---|
| 4 | 75 | | |
| 5 | 74 | | |
| 6 | 73 | | |
| 7 | 72 | | |
| 8 | 73 | | |
| 9 | 76 | 89 | |
| 10 | — | | |
| 11 | — | | |
| 12 | 69 | 84 | 96 |

TABLE V

Examples 4-5, 7-11, and 13-14 - Resin and Film Properties.

| Example | MI (g/10 min) | Density (g/cc) | Dart (g) | Tear MD (g) | Tear TD (g) | Shrink MD (%) | Shrink TD (%) |
|---|---|---|---|---|---|---|---|
| 4 | 1.8 | 0.915 | 1418 | 192 | 543 | 78 | 20 |
| 5 | 1.4 | 0.914 | 1418 | 89 | 560 | 84 | 11 |
| 7 | 2.0 | 0.915 | 1418 | 121 | 485 | 74 | 10 |
| 8 | 1.7 | 0.915 | 1418 | 92 | 520 | 80 | 5 |
| 13 | 1.0 | 0.918 | 1168 | 260 | 399 | 57 | 13 |
| 14 | 0.9 | 0.914 | 1418 | 158 | 314 | 67 | 9 |
| 9 | 1.4 | 0.916 | 1418 | 205 | 388 | 73 | 17 |
| 11 | 0.9 | 0.918 | 178 | 402 | 859 | 77 | 16 |
| 10 | 0.2 | 0.925 | 86 | 44 | 1212 | 91 | 34 |

| Example | Haze (%) | SIT at (1.8 lb/in) (° C.) | Extrusion Amp (kW) | RPM | Output Rate (lb/hr) | Head Pressure (psig) |
|---|---|---|---|---|---|---|
| 4 | 3 | 114 | 12.1 | 100 | 60.4 | 2650 |
| 5 | 5 | 112 | 12.0 | 103 | 59.5 | 2900 |
| 7 | 4 | 116 | 11.5 | 101 | 59.2 | 2500 |
| 8 | 4 | 117 | 11.0 | 112 | 59.0 | 2900 |
| 13 | 7 | 123 | 15.0 | 95 | 59.0 | 3500 |
| 14 | 4 | 115 | 15.5 | 98 | 60.5 | 3200 |
| 9 | 4 | 119 | 14.5 | 84 | 60.2 | 2700 |
| 11 | 13 | 124 | 14.0 | 96 | 60.7 | 3150 |
| 10 | 51 | 129 | 13.2 | 112 | 59.2 | 3400 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. An ethylene polymer having a Mw in a range from about 70,000 to about 200,000 g/mol, a ratio of Mz/Mw in a range from about 1.8 to about 20, and an IB parameter in a range from about 0.92 to about 1.05.

Aspect 2. An ethylene polymer having a Mw in a range from about 70,000 to about 200,000 g/mol, a ratio of Mz/Mw in a range from about 1.8 to about 20, and an ATREF profile characterized by a peak ATREF temperature (temperature of the highest peak on the ATREF curve) in a range from about 68 to about 78° C. (or from about 70 to about 77° C., or from about 72 to about 75° C.), and with no other significant peaks on the ATREF curve.

Aspect 3. The polymer defined in aspect 1 or 2, wherein the ethylene polymer has a Mw in any range disclosed herein, e.g., from about 80,000 to about 180,000 g/mol, from about 80,000 to about 160,000 g/mol, from about 90,000 to about 150,000 g/mol, from about 107,000 to about 140,000 g/mol, etc.

Aspect 4. The polymer defined in any one of aspects 1-3, wherein the ethylene polymer has a ratio of Mz/Mw in any range disclosed herein, e.g., from about 1.8 to about 10, from about 1.9 to about 8, from about 1.9 to about 7, from about 1.9 to about 6.4, from about 1.8 to about 6, from about 2 to about 10, from about 2.2 to about 7, etc.

Aspect 5. The polymer defined in any one of aspects 1-4, wherein the ethylene polymer has an IB parameter in any range disclosed herein, e.g., from about 0.92 to about 1.05, from about 0.94 to about 1.04, from about 0.94 to about 1.03, from about 0.95 to about 1.05, from about 0.96 to about 1.02, from about 0.96 to about 1, etc.

Aspect 6. The polymer defined in any one of aspects 1-5, wherein the ethylene polymer has an ATREF profile characterized by from about 0.05 to about 5 wt. % (or from about 0.1 to about 3 wt. %, or from about 0.3 to about 1 wt. %) of the polymer eluted below a temperature of 40° C. in an ATREF test, by from about 20 to about 40 wt. % (or from about 25 to about 38 wt. %, or from about 29 to about 35 wt. %) of the polymer eluted between 76 and 86° C. in an ATREF test, by from about 7 to about 20 wt. % (or from about 9 to about 18 wt. %, or from about 13 to about 15 wt. %) of the polymer eluted above a temperature of 86° C. in an ATREF test, and the remainder of the polymer (to reach 100 wt. %) eluted between 40 and 76° C. in an ATREF test.

Aspect 7. The polymer defined in any one of aspects 1-6, wherein the ethylene polymer has a melt index (MI) in any range disclosed herein, e.g., from about 0.2 to about 10 g/10 min, from about 0.5 to about 5 g/10 min, from about 0.4 to about 4 g/10 min, from about 0.5 to about 2.5 g/10 min, from about 0.8 to about 2 g/10 min, etc.

Aspect 8. The polymer defined in any one of aspects 1-7, wherein the ethylene polymer has a density in any range disclosed herein, e.g., less than or equal to about 0.935 g/cm$^3$, from about 0.89 to about 0.935 g/cm$^3$, from about 0.90 to about 0.93 g/cm$^3$, from about 0.905 to about 0.925 g/cm$^3$, from about 0.91 to about 0.925 g/cm$^3$, from about 0.912 to about 0.922 g/cm$^3$, from about 0.914 to about 0.918 g/cm$^3$, etc.

Aspect 9. The polymer defined in any one of aspects 1-8, wherein the ethylene polymer has a Mp in any range disclosed herein, e.g., from about 60,000 to about 160,000 g/mol, from about 65,000 to about 150,000 g/mol, from about 70,000 to about 120,000 g/mol, from about 80,000 to about 100,000 g/mol, from about 81,000 to about 117,000 g/mol, etc.

Aspect 10. The polymer defined in any one of aspects 1-9, wherein the ethylene polymer has a Mn in any range disclosed herein, e.g., from about 5,000 to about 65,000 g/mol, from about 10,000 to about 50,000 g/mol, from about 20,000 to about 65,000 g/mol, from about 25,000 to about 60,000 g/mol, from about 30,000 to about 55,000 g/mol, from about 35,000 to about 45,000 g/mol, from about 36,000 to about 44,000 g/mol, etc.

Aspect 11. The polymer defined in any one of aspects 1-10, wherein the ethylene polymer has a Mz in any range disclosed herein, e.g., from about 150,000 to about 1,500,000 g/mol, from about 175,000 to about 1,000,000 g/mol, from about 200,000 to about 900,000 g/mol, from about 210,000 to about 890,000 g/mol, from about 200,000 to about 600,000 g/mol, etc.

Aspect 12. The polymer defined in any one of aspects 1-11, wherein the ethylene polymer has a ratio of Mw/Mn in any range disclosed herein, e.g., from about 2 to about 9, from about 2 to about 4.5, from about 2.3 to about 4, from about 2.3 to about 3.7, from about 2.4 to about 4, from about 2.4 to about 3.5, from about 2.6 to about 3.4, etc.

Aspect 13. The polymer defined in any one of aspects 1-12, wherein the ethylene polymer has a CY-a parameter in any range disclosed herein, e.g., from about 0.05 to about 0.5, from about 0.15 to about 0.5, from about 0.17 to about 0.45, from about 0.2 to about 0.43, from about 0.15 to about 0.35, etc.

Aspect 14. The polymer defined in any one of aspects 1-13, wherein the ethylene polymer has a zero-shear viscosity in any range disclosed herein, e.g., from about 1000 to about 100,000 Pa-sec, from about 3000 to about 50,000 Pa-sec, from about 4000 to about 25,000 Pa-sec, from about 4000 to about 18,000 Pa-sec, from about 4900 to about 16,000 Pa-sec, etc.

Aspect 15. The polymer defined in any one of aspects 1-14, wherein the ethylene polymer has a unimodal molecular weight distribution (single peak).

Aspect 16. The polymer defined in any one of aspects 1-15, wherein the ethylene polymer is a single reactor product, e.g., not a post-reactor blend of two polymers, for instance, having different molecular weight characteristics.

Aspect 17. The polymer defined in any one of aspects 1-16, wherein the ethylene polymer comprises an ethylene/α-olefin copolymer.

Aspect 18. The polymer defined in any one of aspects 1-17, wherein the ethylene polymer comprises an ethylene/1-butene copolymer, an ethylene/1-hexene copolymer, or an ethylene/1-octene copolymer.

Aspect 19. The polymer defined in any one of aspects 1-18, wherein the ethylene polymer comprises an ethylene/1-hexene copolymer.

Aspect 20. An article comprising the ethylene polymer defined in any one of aspects 1-19.

Aspect 21. An article comprising the ethylene polymer defined in any one of aspects 1-19, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Aspect 22. A blown film comprising the ethylene polymer defined in any one of aspects 1-19.

Aspect 23. The film defined in aspect 22, wherein the film has a dart impact strength in any range disclosed herein, e.g., greater than or equal to about 300 g/mil, greater than or equal to about 500 g/mil, greater than or equal to about 1000 g/mil, greater than or equal to about 1400 g/mil, etc.

Aspect 24. The film defined in aspects 22 or 23, wherein the film has a MD Elmendorf tear strength in any range disclosed herein, e.g., from about 40 to about 500 g/mil, from about 45 to about 300 g/mil, from about 50 to about 250 g/mil, from about 70 to about 225 g/mil, from about 80 to about 200 g/mil, etc.

Aspect 25. The film defined in any one of aspects 22-24, wherein the film has a TD Elmendorf tear strength in any range disclosed herein, e.g., from about 350 to about 800 g/mil, from about 400 to about 750 g/mil, from about 425 to about 675 g/mil, from about 480 to about 560 g/mil, etc.

Aspect 26. The film defined in any one of aspects 22-25, wherein the film has a MD shrink in any range disclosed herein, e.g., from about 65 to about 90%, from about 70 to about 90%, from about 70 to about 88%, from about 74 to about 84%, etc.

Aspect 27. The film defined in any one of aspects 22-26, wherein the film has a TD shrink in any range disclosed herein, e.g., from about 2 to about 30%, from about 2 to about 25%, from about 3 to about 22%, from about 5 to about 20%, etc.

Aspect 28. The film defined in any one of aspects 22-27, wherein the film has a haze (without additives) in any range disclosed herein, e.g., less than or equal to about 10%, less than or equal to about 8%, less than or equal to about 6%, from about 3 to about 5%, etc.

Aspect 29. The film defined in any one of aspects 22-28, wherein the film has a seal initiation temperature (to achieve a seal strength of 1.8 lb/in) in any range disclosed herein, e.g., less than or equal to about 120° C., e.g., in a range from about 108 to about 118° C., in a range from about 108 to about 118° C., in a range from about 112 to about 117° C., etc.

Aspect 30. The film defined in any one of aspects 22-29, wherein the film has an average thickness in any range disclosed herein, e.g., from about 0.5 to about 20 mils, from about 0.5 to about 8 mils, from about 0.8 to about 5 mils, from about 0.7 to about 2 mils, etc.

Aspect 31. A catalyst composition comprising catalyst component I comprising any transition metal imine phenolate complex disclosed herein, catalyst component II comprising any bridged metallocene compound disclosed herein, any activator disclosed herein, and optionally, any co-catalyst disclosed herein.

Aspect 32. The composition defined in aspect 31, wherein catalyst component II comprises a bridged zirconium or hafnium based metallocene compound.

Aspect 33. The composition defined in aspect 31, wherein catalyst component II comprises a bridged zirconium or hafnium based metallocene compound with an alkenyl substituent.

Aspect 34. The composition defined in aspect 31, wherein catalyst component II comprises a bridged zirconium or hafnium based metallocene compound with an alkenyl substituent and a fluorenyl group.

Aspect 35. The composition defined in aspect 31, wherein catalyst component II comprises a bridged zirconium or hafnium based metallocene compound with a cyclopentadienyl group and a fluorenyl group, and with an alkenyl substituent on the bridging group and/or on the cyclopentadienyl group.

Aspect 36. The composition defined in aspect 31, wherein catalyst component II comprises a bridged metallocene compound having an alkyl and/or an aryl group substituent on the bridging group.

Aspect 37. The composition defined in aspect 31, wherein catalyst component II comprises a bridged metallocene compound having formula (II):

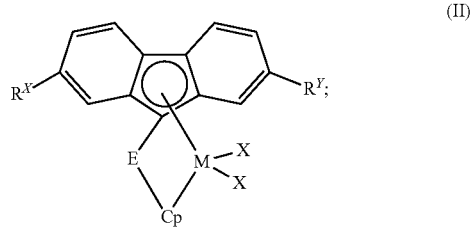

wherein M is any Group IV transition metal disclosed herein; Cp is any cyclopentadienyl, indenyl, or fluorenyl group disclosed herein; each X independently is any monoanionic ligand disclosed herein; $R^X$ and $R^Y$ independently are any substituent disclosed herein; and E is any bridging group disclosed herein.

Aspect 38. The composition defined in any one of aspects 31-37, wherein catalyst component I comprises a transition metal imine phenolate complex having formula (I):

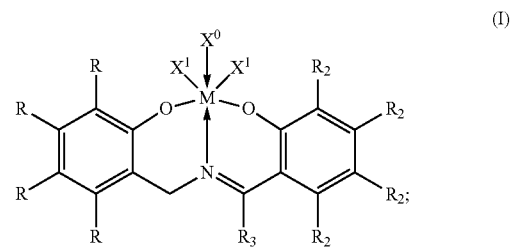

wherein M is any Group IV transition metal disclosed herein; each $X^1$ independently is any monoanionic ligand disclosed herein; R, $R_2$, and $R_3$ independently are any substituent disclosed herein; and $X^0$ is an optional neutral ligand.

Aspect 39. The composition defined in any one of aspects 31-38, wherein the activator comprises an activator-support, an aluminoxane compound, an organoboron or organoborate compound, an ionizing ionic compound, or any combination thereof.

Aspect 40. The composition defined in any one of aspects 31-39, wherein the activator comprises an aluminoxane compound.

Aspect 41. The composition defined in any one of aspects 31-39, wherein the activator comprises an organoboron or organoborate compound.

Aspect 42. The composition defined in any one of aspects 31-39, wherein the activator comprises an ionizing ionic compound.

Aspect 43. The composition defined in any one of aspects 31-39, wherein the activator comprises an activator-support, the activator-support comprising any solid oxide treated with any electron-withdrawing anion disclosed herein.

Aspect 44. The composition defined in any one of aspects 31-39, wherein the activator comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Aspect 45. The composition defined in any one of aspects 31-39, wherein the activator comprises fluorided alumina, sulfated alumina, fluorided silica-alumina, sulfated silica-alumina, fluorided silica-coated alumina, sulfated silica-coated alumina, or any combination thereof.

Aspect 46. The composition defined in any one of aspects 31-39, wherein the activator comprises a fluorided solid oxide and/or a sulfated solid oxide.

Aspect 47. The composition defined in any one of aspects 43-46, wherein the activator further comprises any metal or metal ion disclosed herein, e.g., zinc, nickel, vanadium, titanium, silver, copper, gallium, tin, tungsten, molybdenum, zirconium, or any combination thereof.

Aspect 48. The composition defined in any one of aspects 31-47, wherein the catalyst composition comprises a co-catalyst, e.g., any co-catalyst disclosed herein.

Aspect 49. The composition defined in any one of aspects 31-48, wherein the co-catalyst comprises any organoaluminum compound disclosed herein.

Aspect 50. The composition defined in aspect 49, wherein the organoaluminum compound comprises trimethylaluminum, triethylaluminum, triisobutylaluminum, or a combination thereof.

Aspect 51. The composition defined in any one of aspects 43-50, wherein the catalyst composition comprises catalyst component I, catalyst component II, a solid oxide treated with an electron-withdrawing anion, and an organoaluminum compound.

Aspect 52. The composition defined in any one of aspects 43-51, wherein the catalyst composition is substantially free of aluminoxane compounds, organoboron or organoborate compounds, ionizing ionic compounds, or combinations thereof.

Aspect 53. The composition defined in any one of aspects 31-52, wherein a weight ratio of catalyst component I to catalyst component II in the catalyst composition is in any range disclosed herein, e.g., from about 10:1 to about 1:10, from about 5:1 to about 1:5, from about 2:1 to about 1:2, etc.

Aspect 54. The composition defined in any one of aspects 31-53, wherein the catalyst composition is produced by a process comprising contacting, in any order, catalyst component I, catalyst component II, and the activator.

Aspect 55. The composition defined in any one of aspects 31-53, wherein the catalyst composition is produced by a process comprising contacting, in any order, catalyst component I, catalyst component II, the activator, and the co-catalyst.

Aspect 56. The composition defined in any one of aspects 31-55, wherein a catalyst activity of the catalyst composition is in any range disclosed herein, e.g., from about 500 to about 10,000, from about 750 to about 7,500, from about 1,000 to about 5,000 grams, etc., of ethylene polymer per gram of activator-support per hour, under slurry polymerization conditions, with a triisobutylaluminum co-catalyst, using isobutane as a diluent, and with a polymerization temperature of 80° C. and a reactor pressure of 320 psig.

Aspect 57. An olefin polymerization process, the process comprising contacting the catalyst composition defined in any one of aspects 31-56 with an olefin monomer and an optional olefin comonomer in a polymerization reactor system under polymerization conditions to produce an olefin polymer.

Aspect 58. The process defined in aspect 57, wherein the olefin monomer comprises any olefin monomer disclosed herein, e.g., any $C_2$-$C_{20}$ olefin.

Aspect 59. The process defined in aspect 57 or 58, wherein the olefin monomer and the olefin comonomer independently comprise a $C_2$-$C_{20}$ alpha-olefin.

Aspect 60. The process defined in any one of aspects 57-59, wherein the olefin monomer comprises ethylene.

Aspect 61. The process defined in any one of aspects 57-60, wherein the catalyst composition is contacted with ethylene and an olefin comonomer comprising a $C_3$-$C_{10}$ alpha-olefin.

Aspect 62. The process defined in any one of aspects 57-61, wherein the catalyst composition is contacted with ethylene and an olefin comonomer comprising 1-butene, 1-hexene, 1-octene, or a mixture thereof.

Aspect 63. The process defined in any one of aspects 57-59, wherein the olefin monomer comprises propylene.

Aspect 64. The process defined in any one of aspects 57-63, wherein the polymerization reactor system comprises a batch reactor, a slurry reactor, a gas-phase reactor, a solution reactor, a high pressure reactor, a tubular reactor, an autoclave reactor, or a combination thereof.

Aspect 65. The process defined in any one of aspects 57-64, wherein the polymerization reactor system comprises a slurry reactor, a gas-phase reactor, a solution reactor, or a combination thereof.

Aspect 66. The process defined in any one of aspects 57-65, wherein the polymerization reactor system comprises a loop slurry reactor.

Aspect 67. The process defined in any one of aspects 57-66, wherein the polymerization reactor system comprises a single reactor.

Aspect 68. The process defined in any one of aspects 57-66, wherein the polymerization reactor system comprises 2 reactors.

Aspect 69. The process defined in any one of aspects 57-66, wherein the polymerization reactor system comprises more than 2 reactors.

Aspect 70. The process defined in any one of aspects 57-69, wherein the olefin polymer comprises any olefin polymer disclosed herein.

Aspect 71. The process defined in any one of aspects 57-62 and 64-70, wherein the olefin polymer comprises an ethylene homopolymer, an ethylene/1-butene copolymer, an ethylene/1-hexene copolymer, or an ethylene/1-octene copolymer.

Aspect 72. The process defined in any one of aspects 57-62 and 64-70, wherein the olefin polymer comprises an ethylene/1-hexene copolymer.

Aspect 73. The process defined in any one of aspects 57-59 and 63-70, wherein the olefin polymer comprises a polypropylene homopolymer or a propylene-based copolymer.

Aspect 74. The process defined in any one of aspects 57-73, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 75. The process defined in any one of aspects 57-74, wherein the polymerization conditions are substantially constant, e.g., for a particular polymer grade.

Aspect 76. The process defined in any one of aspects 57-75, wherein no hydrogen is added to the polymerization reactor system.

Aspect 77. The process defined in any one of aspects 57-75, wherein hydrogen is added to the polymerization reactor system.

Aspect 78. The process defined in any one of aspects 57-77, wherein the olefin polymer produced is defined in any one of aspects 1-19.

Aspect 79. An olefin polymer produced by the olefin polymerization process defined in any one of aspects 57-77.

Aspect 80. An ethylene polymer defined in any one of aspects 1-19 produced by the process defined in any one of aspects 57-77.

Aspect 81. An article (e.g., a blown film) comprising the polymer defined in any one of aspects 79-80.

Aspect 82. A method or forming or preparing an article of manufacture comprising an olefin polymer, the method comprising (i) performing the olefin polymerization process defined in any one of aspects 57-77 to produce an olefin polymer (e.g., the ethylene polymer of any one of aspects 1-19), and (ii) forming the article of manufacture comprising the olefin polymer, e.g., via any technique disclosed herein.

Aspect 83. The article defined in any one of aspects 81-82, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

We claim:

1. An ethylene polymer having:
    a $M_w$ in a range from about 70,000 to about 200,000 g/mol;
    a ratio of $M_z/M_w$ in a range from about 1.8 to about 20;
    an IB parameter in a range from about 0.92 to about 1.05; and
    a CY-a parameter in a range from about 0.2 to about 0.3.

2. An article of manufacture comprising the ethylene polymer of claim 1.

3. The polymer of claim 1, wherein:
    the $M_w$ is in a range from about 80,000 to about 160,000 g/mol;
    the ratio of $M_z/M_w$ is in a range from about 1.9 to about 8; and
    the IB parameter is in a range from about 0.94 to about 1.03.

4. The polymer of claim 3, wherein the ethylene polymer has:
    a melt index in a range from about 0.5 to about 5 g/10 min; and
    a density in a range from about 0.90 to about 0.93 g/cm$^3$.

5. The polymer of claim 4, wherein:
    the ethylene polymer has a unimodal molecular weight distribution; and
    the ethylene polymer comprises an ethylene/1-butene copolymer, an ethylene/1-hexene copolymer, an ethylene/1-octene copolymer, or a combination thereof.

6. An article of manufacture comprising the ethylene polymer of claim 5.

7. The polymer of claim 1, wherein the ethylene polymer has:
    a melt index in a range from about 0.5 to about 2.5 g/10 min; and
    a density in a range from about 0.905 to about 0.925 g/cm$^3$.

8. The polymer of claim 7, wherein:
    the ethylene polymer has a ratio of $M_w/M_n$ in a range from about 2.4 to about 4; and
    the ratio of $M_z/M_w$ is in a range from about 2.2 to about 7.

9. The polymer of claim 1, wherein the ethylene polymer has:
    a $M_p$ in a range from about 70,000 to about 120,000 g/mol; and
    a $M_n$ in a range from about 25,000 to about 60,000 g/mol.

10. The polymer of claim 9, wherein the ethylene polymer has:
    a zero-shear viscosity in a range from about 3000 to about 50,000 Pa-sec; and
    a density in a range from about 0.91 to about 0.925 g/cm$^3$.

11. An article of manufacture comprising the ethylene polymer of claim 10.

12. The article of claim 11, wherein the ethylene polymer has a unimodal molecular weight distribution.

13. A blown film comprising the polymer of claim 1, wherein the film has an average thickness in a range from about 0.5 to about 8 mils.

14. A blown film comprising an ethylene polymer having:
    a $M_w$ in a range from about 70,000 to about 200,000 g/mol;
    a ratio of $M_z/M_w$ in a range from about 1.8 to about 20; and
    an IB parameter in a range from about 0.92 to about 1.05;
    wherein the film has a haze of less than or equal to about 6%.

15. The blown film of claim 14, wherein the ethylene polymer has:
    a melt index in a range from about 0.5 to about 5 g/10 min;
    a density in a range from about 0.90 to about 0.93 g/cm$^3$; and
    a ratio of $M_w/M_n$ in a range from about 2.4 to about 4.

16. The blown film of claim 15, wherein the ethylene polymer comprises an ethylene/1-butene copolymer, an ethylene/1-hexene copolymer, an ethylene/1-octene copolymer, or a combination thereof.

17. The blown film of claim 14, wherein the film has:
    an average thickness in a range from about 0.7 to about 2 mils;
    a dart impact strength of greater than or equal to about 300 g/mil;
    a MD Elmendorf tear strength in a range from about 40 to about 500 g/mil; and
    a TD Elmendorf tear strength in a range from about 350 to about 800 g/mil.

18. The blown film of claim 17, wherein
    the film has a MD shrink in a range from about 65 to about 90%, and a TD shrink in a range from about 2 to about 30%; and
    the ethylene polymer comprises an ethylene/1-butene copolymer, an ethylene/1-hexene copolymer, an ethylene/1-octene copolymer, or a combination thereof.

19. An ethylene polymer having:
    a $M_w$ in a range from about 70,000 to about 200,000 g/mol;
    a ratio of $M_z/M_w$ in a range from about 1.8 to about 20;
    an IB parameter in a range from about 0.92 to about 1.05; and
    a density in a range from about 0.90 to about 0.93 g/cm$^3$.

20. The polymer of claim 19, wherein:
    the ethylene polymer has a ratio of $M_w/M_n$ in a range from about 2.3 to about 6, and the ratio of $M_z/M_w$ is in a range from about 2 to about 8; and
    the ethylene polymer comprises an ethylene/1-butene copolymer, an ethylene/1-hexene copolymer, an ethylene/1-octene copolymer, or a combination thereof.

21. The polymer of claim 20, wherein the density is in a range from about 0.91 to about 0.925 g/cm$^3$.

* * * * *